(12) United States Patent
Kim et al.

(10) Patent No.: US 11,746,215 B2
(45) Date of Patent: *Sep. 5, 2023

(54) MOLDED ARTICLE

(71) Applicant: Furukawa Electric Co., Ltd., Tokyo (JP)

(72) Inventors: Jaekyung Kim, Tokyo (JP); Kenichi Suyama, Tokyo (JP); Yasuo Nakajima, Tokyo (JP); Eiji Kozawa, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/833,222

(22) Filed: Mar. 27, 2020

(65) Prior Publication Data

US 2020/0224009 A1   Jul. 16, 2020

Related U.S. Application Data

(63) Continuation of application No. PCT/JP2018/036584, filed on Sep. 28, 2018.

(30) Foreign Application Priority Data

Sep. 29, 2017  (JP) ................................. 2017-190826
Sep. 29, 2017  (JP) ................................. 2017-190827
(Continued)

(51) Int. Cl.
*C08L 1/02*     (2006.01)
*C08L 101/02*   (2006.01)
(Continued)

(52) U.S. Cl.
CPC .............. *C08L 1/02* (2013.01); *C08L 101/025* (2013.01); *C08L 51/06* (2013.01); *F21V 15/01* (2013.01); *H01R 13/504* (2013.01)

(58) Field of Classification Search
CPC ......... C08L 1/02; C08L 51/06; C08L 101/025
See application file for complete search history.

(56) References Cited

U.S. PATENT DOCUMENTS 3,464,952 A * 9/1969 Larsen ...................... C08F 8/36
522/127
3,645,939 A   2/1972 Gaylord Norman G
(Continued)

FOREIGN PATENT DOCUMENTS

CN   101896551 A   11/2010
CN   102040831 A   5/2011
(Continued)

OTHER PUBLICATIONS

EPO machine translation of JPH101575 A, retrieved Dec. 2022 (Year: 2022).*
(Continued)

*Primary Examiner* — Nicole M. Buie-Hatcher
(74) *Attorney, Agent, or Firm* — Dorsey & Whitney LLP

(57) ABSTRACT

The present disclosure relates to a molded article provided with a resin part formed with a thermoplastic resin composition containing 5 to 70 parts by mass of cellulose based on 100 parts by mass of the thermoplastic resin and containing an organic peroxide, wherein a tensile strength of a resin molded body formed with the thermoplastic resin composition measured in accordance with JIS K 7161 is 40 MPa or more.

8 Claims, 6 Drawing Sheets

(30) Foreign Application Priority Data

| | | |
|---|---|---|
| Sep. 29, 2017 | (JP) | 2017-190829 |
| Sep. 29, 2017 | (JP) | 2017-190830 |
| Oct. 31, 2017 | (JP) | 2017-210342 |
| May 22, 2018 | (JP) | 2018-098149 |

(51) Int. Cl.

*C08L 51/06* (2006.01)
*F21V 15/01* (2006.01)
*H01R 13/504* (2006.01)

(56) References Cited

U.S. PATENT DOCUMENTS

| | | | |
|---|---|---|---|
| 3,856,724 A | 12/1974 | O Connor et al. | |
| 3,962,157 A * | 6/1976 | Nakano | C08L 23/10 523/218 |
| 4,380,522 A | 4/1983 | Georlette et al. | |
| 2003/0157351 A1 | 8/2003 | Swatloski et al. | |
| 2004/0214925 A1 | 10/2004 | Sigworth | |
| 2005/0288484 A1 | 12/2005 | Holbrey et al. | |
| 2007/0141337 A1 | 6/2007 | Mehta et al. | |
| 2007/0208110 A1* | 9/2007 | Sigworth | C08L 23/0815 524/13 |
| 2008/0146701 A1 | 6/2008 | Sain et al. | |
| 2008/0188636 A1 | 8/2008 | Argyropoulos et al. | |
| 2010/0267942 A1 | 10/2010 | Buchanan et al. | |
| 2010/0292381 A1 | 11/2010 | Kamikawa | |
| 2010/0305249 A1 | 12/2010 | Buchanan et al. | |
| 2011/0086948 A1 | 4/2011 | Han et al. | |
| 2011/0244217 A1 | 10/2011 | Matsushita | |
| 2011/0244223 A1 | 10/2011 | Matsushita | |
| 2012/0041080 A1 | 2/2012 | Buchanan et al. | |
| 2012/0121830 A1 | 5/2012 | Buchanan et al. | |
| 2012/0214911 A1 | 8/2012 | Yano et al. | |
| 2012/0225976 A1 | 9/2012 | Bampi | |
| 2014/0073776 A1 | 3/2014 | Shiramizu et al. | |
| 2014/0121307 A1* | 5/2014 | Cao | C08L 97/00 524/73 |
| 2014/0227605 A1 | 8/2014 | Nakamura et al. | |
| 2014/0336309 A1* | 11/2014 | Sakata | C08K 7/02 524/35 |
| 2014/0343271 A1 | 11/2014 | Buchanan et al. | |
| 2014/0350188 A1 | 11/2014 | Hamad et al. | |
| 2015/0105499 A1 | 4/2015 | Yano et al. | |
| 2015/0198301 A1 | 7/2015 | Yasuda et al. | |
| 2016/0002461 A1 | 1/2016 | Tsujii et al. | |
| 2016/0075877 A1 | 3/2016 | Kaiser | |
| 2016/0229997 A1 | 8/2016 | Mohanty et al. | |
| 2016/0289375 A1 | 10/2016 | Nakamura et al. | |
| 2017/0002182 A1 | 1/2017 | Imai et al. | |
| 2017/0218188 A1 | 8/2017 | Kozawa et al. | |
| 2019/0023877 A1 | 1/2019 | Kozawa et al. | |
| 2019/0023882 A1* | 1/2019 | Kim | C08K 5/14 |
| 2019/0031858 A1 | 1/2019 | Kozawa et al. | |
| 2020/0010654 A1 | 1/2020 | Kim et al. | |
| 2020/0224007 A1 | 7/2020 | Kim et al. | |
| 2020/0224008 A1 | 7/2020 | Kim et al. | |
| 2020/0255630 A1 | 8/2020 | Kim et al. | |

FOREIGN PATENT DOCUMENTS

| | | | |
|---|---|---|---|
| CN | 103534275 A | 1/2014 | |
| CN | 104292412 A | 1/2015 | |
| CN | 104334615 A | 2/2015 | |
| EP | 822223 A1 * | 2/1998 | C08F 255/00 |
| EP | 0897943 A2 | 2/1999 | |
| EP | 2268857 A1 | 1/2011 | |
| EP | 2419453 A1 | 2/2012 | |
| EP | 2419454 A1 | 2/2012 | |
| EP | 2492305 A1 | 8/2012 | |
| EP | 2268857 B1 | 9/2012 | |
| EP | 3216806 A1 | 9/2017 | |
| EP | 3604424 A1 | 2/2020 | |
| EP | 3689972 A1 | 8/2020 | |
| GB | 2310213 A | 8/1997 | |
| JP | S55131031 A | 10/1980 | |
| JP | S58139593 A | 8/1983 | |
| JP | S6239642 A | 2/1987 | |
| JP | S6333448 A | 2/1988 | |
| JP | H05269736 A | 10/1993 | |
| JP | H08169015 A | 7/1996 | |
| JP | H08267597 A | 10/1996 | |
| JP | H09280345 A | 10/1997 | |
| JP | H09316248 A | 12/1997 | |
| JP | H101575 A | 1/1998 | |
| JP | H11217468 A | 8/1999 | |
| JP | 2000264974 A | 9/2000 | |
| JP | 2003105100 A | 4/2003 | |
| JP | 2003105203 A | 4/2003 | |
| JP | 3479661 B2 | 12/2003 | |
| JP | 2004293569 A | 10/2004 | |
| JP | 2004320670 A | 11/2004 | |
| JP | 2005187524 A | 7/2005 | |
| JP | 4013870 B2 | 11/2007 | |
| JP | 2008160360 A | 7/2008 | |
| JP | 2008297364 A | 12/2008 | |
| JP | 2009167250 A | 7/2009 | |
| JP | 2010089483 A | 4/2010 | |
| JP | 2011093990 A | 5/2011 | |
| JP | 2011116838 A | 6/2011 | |
| JP | 2011213966 A | 10/2011 | |
| JP | 2011219571 A | 11/2011 | |
| JP | 2012087199 A | 5/2012 | |
| JP | 2012102324 A | 5/2012 | |
| JP | 2012207063 A | 10/2012 | |
| JP | 2012524145 A | 10/2012 | |
| JP | 3180021 B2 | 11/2012 | |
| JP | 3180021 U | 11/2012 | |
| JP | 2012214563 A | 11/2012 | |
| JP | 2012236906 A | 12/2012 | |
| JP | 2013056958 A | 3/2013 | |
| JP | 2013107987 A | 6/2013 | |
| JP | 2013189574 A | 9/2013 | |
| JP | 2013234268 A | 11/2013 | |
| JP | 2013248824 A | 12/2013 | |
| JP | 2014001361 A | 1/2014 | |
| JP | 2014015512 A | 1/2014 | |
| JP | 2014129509 A | 7/2014 | |
| JP | 2014193959 A | 10/2014 | |
| JP | 2015050052 A | 3/2015 | |
| JP | 2015183153 A | 10/2015 | |
| JP | 2015203093 A | 11/2015 | |
| JP | 2015209439 A | 11/2015 | |
| JP | 2016017096 A | 2/2016 | |
| JP | 2016094516 A | 5/2016 | |
| JP | 2017128717 A | 7/2017 | |
| JP | 2017132988 A | 8/2017 | |
| JP | 2017145392 A | 8/2017 | |
| JP | 2017145393 A | 8/2017 | |
| JP | 2017155248 A | 9/2017 | |
| JP | 2017171698 A | 9/2017 | |
| KR | 20100129293 A | 12/2010 | |
| WO | 03029329 A2 | 4/2003 | |
| WO | 2008069121 A1 | 6/2008 | |
| WO | 2009118262 A1 | 10/2009 | |
| WO | 2010120269 A1 | 10/2010 | |
| WO | 2013035786 A1 | 3/2013 | |
| WO | 2013133093 A1 | 9/2013 | |
| WO | 2014017274 A1 | 1/2014 | |
| WO | 2015039237 A1 | 3/2015 | |
| WO | 2015152189 A1 | 10/2015 | |
| WO | 2016063914 A1 | 4/2016 | |
| WO | 2015053226 A1 | 3/2017 | |
| WO | 2017141779 A1 | 8/2017 | |
| WO | 2017165957 A1 | 10/2017 | |
| WO | 2017170745 A1 | 10/2017 | |

(56) References Cited

FOREIGN PATENT DOCUMENTS

| WO | 2017170746 A1 | 10/2017 |
|---|---|---|
| WO | 2017170747 A1 | 10/2017 |

OTHER PUBLICATIONS

English translation of International Preliminary Report on Patentability for Application No. PCT/JP2018/036584, dated Mar. 31, 2020.
English translation of International Search Report and Written Opinion for Application No. PCT/JP2018/036584, dated Dec. 18, 2018.
English translation of Written Opinion for Application No. PCT/JP2018/036584, dated Dec. 18, 2018.
Brintzinger, Hans H. et al., "Stereospecific Olefin Polymerization with Chiral Metallocene Catalysts", Angewandte Chemie International Edition in English, vol. 34, Issue 11, Jun. 16, 1995, 1143-1170.
Ewen, John et al., "Syndiospecific Propylene Polymerizations With Group 4 Metallocenes", Journal of the American Chemical Society, vol. 110 No. 18, Aug. 1, 1988, 6255.
Wahlström, Ronny et al., "Enzymatic Hydrolysis of Lignocellulosic Polysaccharides in the Presence of Ionic Liquids", Green Chemistry, vol. 17, Nov. 7, 2014, 694-714.
Yamashita, Shinzo et al., Handbook of Crosslinking Agent, Oct. 1981, 162.
Zambelli, A. et al., "Model Compounds and 13C NMR Observation of Stereosequences of Polypropylene", Macromolecules vol. 8 No. 5, Sep. 1, 1975, 687.
Extended European Search Report dated May 11, 2021 received in EP application 18863337.4.
Ota, English-language machine translation of JP2005187524A ("Ota"), performed on Espacenet on Apr. 20, 2021, 11 pages, 11 pages.
Suzuki, Katsuhito et al., "Development of continuous process enabling nanofibrillation of pulp and melt compounding", Cellulose, Springer Netherlands, Netherlands, vol. 20, No. 1, Feb. 1, 2013, (Feb. 1, 2013), pp. 201-210, XP036830877.
[English Translation] Decision of Rejection dated Mar. 25, 2021 for Chinese Application No. 201780017841.5.
[English Translation] First Office Action dated Aug. 26, 2020 for Chinese Application No. 201780018439.9.
[English Translation] First Office Action dated Jan. 19, 2022 for Chinese Patent Application No. 201880070847.3.
[English Translation] First Office Action dated Jun. 11, 2021 for the Chinese Patent Application No. 201880009893.2.
[English Translation] International Search Report dated Jul. 4, 2017 for PCT Application No. PCT/JP2017/013024.
[English Translation] International Search Report dated Jun. 12, 2018 for International Patent Application No. PCT/JP2018/009757.
[English Translation] International Search Report dated Jun. 27, 2017 for PCT Application No. PCT/JP2017/013022.
[English Translation] Notice of Reasons for Refusal dated Feb. 9, 2021 for Japanese Patent Application No. 2018-509368.
[English Translation] Notice of Reasons for Refusal dated Feb. 9, 2021 for Japanese Patent Application No. 2018-509370.
[English Translation] Notice of Reasons for Refusal dated Sep. 14, 2021 for Japanese Patent Application No. 2019-509210.
[English Translation] Second Office Action dated Jan. 30, 2022 for Chinese Patent Application No. 201880063825.4.
[English Translation] Second Office Action dated Jun. 3, 2021 for Chinese Patent Application No. 201780018439.9.
[English Translation] Second Office Action dated Oct. 13, 2021 for Chinese Patent Application No. 201880009893.2.
[English Translation] The First Office Action dated Jul. 3, 2020 for Chinese Application No. 201780017841.5.
[English Translation] The Second Office Action dated Dec. 10, 2020 for Chinese Application No. 201780017841.5.
Extended European Search Report dated Nov. 29, 2019 for European Patent Application No. 17775281.3.
Extended European Search Report dated Nov. 23, 2020 for European Patent Application No. 18776773.6.
Extended European Search Report dated Oct. 8, 2019 for European Patent Application No. EP17775279.
Extended European Search Report dated Sep. 15, 2020 for European Patent Application No. 20170209.9.
Final Rejection for U.S. Appl. No. 16/144,430, dated Dec. 16, 2021.
Non-Final Rejection for U.S. Appl. No. 16/144,430, dated Jun. 18, 2021.
English translation of Office Action for CN Application No. 201880063825.4, dated Jul. 5, 2021.
English-language machine translation of JP201207063, performed on Espacenet on Sep. 1, 2021.
Satas, D. et al., "Coatings Technology Handbook (Second Edition)", China Petrochemical Press, Jan. 2003, 9 pgs.
Communication pursuant to Rule 114(2) EPC with annexed third party observations under Article 115 EPC dated Apr. 12, 2022 for European Patent Application No. 18860626.3.
[English Translation] Second Office Action dated Jun. 7, 2022 for Chinese Patent Application No. 201880070847.3; pp. all.
[English Translation] Notice of Reasons for Refusal dated Jun. 28, 2022 for Japanese Patent Application No. 2019-550436; pp. all.
Non Final Office Action issued in U.S. Appl. No. 16/144,304 dated Apr. 28, 2022; pp. all.
Non Final Office Action issued in U.S. Appl. No. 16/144,430, dated Apr. 28, 2022; pp. all.
The Editors of Encyclopaedia Britannica, "Kraft Process", Encyclopedia Britannica, Sep. 7, 2015, https://www.britannica.com/technology/kraft-process; captured Apr. 23, 2022; pp. all.
[English Translation] Notice of Submission of Publications and Reasons for Submission dated Apr. 15, 2022 for Japanese Patent Application No. 2019-545199; pp. all.
[English Translation] Second Office Action dated Jan. 24, 2022 for Chinese Patent Application No. 201880063819.9, pp. all.
[English Translation] Second Office Action dated Jan. 29, 2022 for Chinese Patent Application No. 201880063823.5, pp. all.
[English Translation] Duan, Jiufang "Natural Polymeric Materials", Wuhan: Huazhong University of Science and Technology Press; ISBN 978-7-5680-1309-3, Jun. 2011, pp. all.
[English Translation] Wang, Guoquan , "Principles and Applications of Polymer Blend Modification", Beijing: China Light Industry Press ISBN 978-7-5019-5741-5, Jul. 2007, pp. all.
[English Translation] Notice of Reasons for Refusal dated May 30, 2022 for Japanese Patent Application No. 2019-545198; pp. all.
[English Translation] Notice of Reasons for Refusal dated Jul. 13, 2022 for Japanese Patent Application No. 2019-545199.
[English Translation] Notice of Reasons for Refusal dated Jul. 13, 2022 for Japanese Patent Application No. 2019-545200.
[English Translation] Rejection Decision dated Jul. 1, 2022 for Chinese Patent Application No. 201880063819.9.
[English Translation] Rejection Decision dated Jul. 1, 2022 for Chinese Patent Application No. 201880063823.5.
[English Translation] Rejection Decision dated Jul. 1, 2022 for Chinese Patent Application No. 201880063825.4.
Decision of Rejection for CN Application No. 201880009893.2, dated Jan. 18, 2022; pp. all [English Translation].
Non Final Rejection Action dated Mar. 15, 2022 for U.S. Appl. No. 16/832,986; pp. all.
Juliusz Pernak et al. "New Ionic Liquids and Their Antielectrostatic Properties" 40 Ind. Eng. Chem. Res.; published May 5, 2001; pp. 2379-2383.
[English Translation] Nippon Paper Group Website "Products Functional cellulose KC FLOCK(R) (Powdered Cellulose), NP fibers (plant fibers)" http://www.nipponpapergroup.com/products/chemical/functional_cellulose/kcflock.html, pp. all.
[English Translation] Notice of Reasons for Refusal for Japanese Patent Application No. 2019-550436 dated Dec. 13, 2022.
[English Translation] Notice of Submission of Publication and Reasons for Submission for Japanese Patent Application No. 2019-550436 dated Dec. 1, 2022, pp. all.
[English Translation] Notice of Reasons for Refusal for Japanese Patent Application No. 2019-545198 dated Nov. 8, 2022, pp. all.

(56) References Cited

OTHER PUBLICATIONS

[English Translation] Third Office Action dated Aug. 31, 2022 for CN application No. 201880070847.3; pp. all.
Notice of Reasons for Refusal dated Apr. 26, 2023 in JP Application No. 2019-550436; pp. all.
Notice of Submission of Publications and Reasons for Submission dated Mar. 14, 2023 in JP Application No. 2019-550436; pp. all.
Notice of Submission of Publications and Reasons for Submission dated Mar. 22, 2023 in JP Application No. 2019-550436; pp. all.
A. E. Lewandowska and S. J. Eichhorn "Quantification of the Degree of Mixing of Cellulose Nanocrystals in Thermoplastics Using Raman Spectroscopy" Journal of Raman Spectroscopy, Published Jul. 1, 2016; pp. 1337-1342.

* cited by examiner

MOLDED ARTICLE

CROSS REFERENCE TO RELATED APPLICATIONS

This is a continuation application of International Patent Application No. PCT/JP2018/036584 filed Sep. 28, 2018, which claims the benefits of Japanese Patent Applications No. 2017490826 filed. Sep. 29, 2017, No. 2017-190827 filed Sep. 29, 2017, No. 2017490829 filed Sep. 29, 2017, No. 2017490830 filed Sep. 29, 2017, No. 2017-210342 filed. Oct. 31, 2017, No. 2018-098149 filed May 22, 2018 and the full contents of all of which are hereby incorporated by reference in their entirety.

BACKGROUND

Technical Field

The present disclosure relates to a molded article, such as a lamp body of a lighting appliance, a speaker unit, a connection box, a connector, a pulley, and a film for a house, the molded article being provided with a resin part, and particularly relates to a molded article provided with a resin part prepared by injection molding, T-die molding, or the like. In particular, the present disclosure relates to: a molded article, such as a lamp body of a lighting appliance, a speaker unit, a connection box, a connector, a pulley, and a film for a house, the molded article being provided with a resin part, the resin part having a high mechanical strength and formed with a cellulose-reinforced thermoplastic resin composition containing a thermoplastic resin and a cellulose reinforcing agent; and a material for a molded article, such as a lamp body of a lighting appliance, a speaker unit, a connection box, a connector, a pulley, and a film for a house, the molded article being provided with a resin part formed with a thermoplastic resin composition for obtaining a cellulose-reinforced thermoplastic resin composition.

Description of the Related Art

In recent years, for the purpose of reducing fuel consumption of a vehicle, such as an automobile, further weight reduction of the vehicle has been required. To reduce the weight of a vehicle, not only the weight of a large part, such as a body forming the vehicle, but also the weights of various members, such as a lighting appliance including a headlight or the like, a speaker unit for automotive application as one component of an audio system to be loaded on the vehicle, a connection box and a connector for an automobile, and a guide pulley for a belt that drives engine accessories or the like of an automobile, need to be reduced.

The lighting appliance for a vehicle is generally provided with a lamp body including an opening, a front cover that covers the opening, an extension, a reflection mirror (reflector), a light source, electrical components, and the like. To reduce the weight of the lighting appliance for a vehicle, it is effective to form the lamp body with a resin material, the lamp body having a relatively high ratio of the weight to the total weight of the lighting appliance for a vehicle among the components of the lighting appliance for a vehicle.

In addition to further weight reduction, improvements in strength characteristics against vibration and in acoustic characteristics as a speaker unit are also required in the speaker unit for automotive application. To meet such requirements, it is desirable to form, for example, a case body (enclosure or cabinet), a frame, and the like of the speaker unit with a suitable compounded material.

The connection box and connector for an automobile is generally produced by performing injection molding using a glass fiber-reinforced thermoplastic resin composition in which a glass fiber is dispersed as a reinforcing material. The use of such a highly strong resin enables thinning and weight reduction of the connection box and the connector. On the other hand, when the connection box, the connector, and the like are produced by injection molding, runner end materials and mis-shot products are produced. In addition, connection boxes, connectors, and the like formed using a glass fiber-reinforced thermoplastic resin are collected from scrapped cars in some cases. However, deterioration in strength of a recycled glass fiber-reinforced thermoplastic resin due to recycling is significant. Therefore, when a recycled glass fiber-reinforced thermoplastic resin is used, thinning and weight reduction of a connection box, a connector, and the like are difficult from the viewpoint of retaining the strength. Thus, a fiber-reinforced material such that effects of thinning and weight reduction are not lost even if it is recycled, the fiber-reinforced material being excellent in recyclability, is desired.

In a pulley for a vehicle, a resin part is in general integrally molded along the outer periphery of a rolling bearing, and the resin part is formed by injection molding using a resin or the like containing a reinforced fiber from the viewpoint of productivity. However, in the case of the injection molding, a gate for adjusting the inlet velocity of a resin material is essential for an injection molding machine. In addition, at a part where the resin materials having flown from the gate into a metal mold join, a weld is produced to generate nonuniformity of the reinforced fiber in a circumferential direction, so that there is a possibility that unevenness in strength and size accuracy occurs. Therefore, when a pulley is produced by injection molding, the size accuracy of the outer peripheral portion, which guides a belt, in the resin part, the strength characteristics and the like to endure the tension of the belt are required. Being excellent in size accuracy is also required similarly in the lamp body.

Such weight reduction and improvements in strength characteristics of various molded members are also required in, for example, molded members, for a house for agriculture, not limited to members for a vehicle, such as an automobile. The house for agriculture is widely used for the purpose of protecting products in the house from the outside and retaining a constant environment. A transparent film using as the main raw material vinyl chloride, polyethylene, a polyethylene-vinyl acetate copolymer, polyethylene terephthalate (PET), a polyethylene-tetrafluoroethylene copolymer, or the like is mainly used as a film for a house for agriculture so that situation of the inside can be grasped to a certain extent from the outside. Further, in recent years, the scale of an agricultural house has been made large in some cases from the viewpoint such as improving productivity. In a large-scale house for agriculture, the weight of the film to be used for the house increases, making an influence on the skeleton that supports the whole house large. In addition, an area where a flying object from the outside contacts increases. Therefore, weight reduction, high modulus of elastic d high strength are required in a film for a house. Further, the recyclability of a material is also required in some cases from the viewpoint of efficient utilization of resources in recent years.

To meet the requirements as described above, cellulose fiber is regarded as promising as a compounding material for the resin part which various members are provided with. The cellulose fiber has excellent characteristics, such as a light weight, a high strength, a high modulus of elasticity, and a low linear thermal expansion, and therefore is widely known as a reinforcement material for a resin or the like. In addition, cellulose exists on the earth in a large amount and is a renewable natural resource, and therefore cellulose is suitable as a material having a high recyclability. Further, a micronized cellulose fiber has a more satisfactory surface smoothness as compared to a glass fiber and a carbon fiber. However, the cellulose fiber has a very high hydrophilicity and therefore has a poor affinity to a highly hydrophobic resin, such as polypropylene or polyethylene, so that the cellulose cannot be mixed uniformly with such a resin by only performing kneading mechanically with a twin-screw extruder or the like. Therefore, the mechanical properties of a resultant composite material have not necessarily been satisfiable and have been insufficient. Generally, in the case where a highly hydrophilic thermoplastic resin, such as polyethylene or polypropylene, is used when a molded material containing a cellulose fiber is produced, the dispersibility of the cellulose fiber is poor, making it very difficult to obtain further mechanical strength.

To solve such a problem, a technique of using a compatibilizer for the purpose of changing the dispersibility of cellulose in a resin for the better is known. In addition, attempts to improve the dispersibility of cellulose in a resin by subjecting the cellulose or the resin to a modification treatment with a modifier or the like are made.

For example, in Japanese Patent Application Laid-Open No. S62-39642 and United States Patent Application Publication No. US 2008/0146701, using an unsaturated dicarboxylic acid and/or an anhydride thereof as a compatibilizer or an interface reinforcement agent in a resin composition containing a cellulose-based material and a polyolefin is proposed. In Japanese Patent Application Laid-Open No. 2012-214563, using a polybasic acid anhydride as a hydrophobically modifying agent in part of hydroxy groups of microfibrillated cellulose to use a resultant hydrophobically modified cellulose fiber as a reinforcement material for a resin is proposed. In Japanese Patent No. 3479661, improving the dispersibility of cellulose by using polyethylene obtained by grafting a monomer having a carboxy group, which has affinity to a hydroxy group existing in cellulose, through a particular method is proposed.

Even though any of the above-described methods is used, the mechanical strength of a molded article is improved due to the reinforcement effect of cellulose, but further improvements in the mechanical strength are desired.

SUMMARY

The present disclosure is related to providing a molded article provided with a resin part formed with a thermoplastic resin composition capable of dispersing cellulose simply and uniformly in a highly hydrophobic resin and capable of improving the mechanical strength of a molded material formed using a resultant resin composition.

According to an aspect of the present disclosure, a molded article includes a resin part formed with a thermoplastic resin composition. The thermoplastic resin composition includes 5 to 70 parts by mass of cellulose based on 100 parts by mass of a thermoplastic resin and includes an organic peroxide, wherein a tensile strength of a resin molded body formed with the thermoplastic resin composition measured in accordance with JIS K 7161 is 40 MPa or more.

Further, it is preferable that the thermoplastic resin includes a polyolefin resin modified by grafting an unsaturated carboxylic acid or an anhydride thereof.

Further, it is preferable that a one-minute half-life temperature of the organic peroxide is 130 to 190° C.

Further, it is preferable that the organic peroxide is at least one organic peroxide selected from a dialkyl peroxide, a peroxyketal, a diacyl peroxide, an alkyl peroxyester, and a monoperoxycarbonate.

Further, it is preferable that a content of the organic peroxide is 0.01 to 0.30 parts by mass based on 100 parts by mass of the thermoplastic resin.

Further, it is preferable that the thermoplastic resin includes a polyolefin resin modified by grafting an unsaturated carboxylic acid or an anhydride thereof, and the polyolefin resin modified by grafting an unsaturated carboxylic acid or an anhydride thereof is a maleic anhydride-modified polyolefin resin.

Further, it is preferable that the thermoplastic resin is a mixed resin of a polyolefin resin modified by grafting an unsaturated carboxylic acid or an anhydride thereof, and a polyolefin resin not modified with an unsaturated carboxylic acid or an anhydride thereof.

According to another aspect of the present disclosure, a molded article includes a resin part formed with a cellulose-reinforced thermoplastic resin composition. The cellulose-reinforced thermoplastic resin composition includes an ester-bonded composite resin of a hydroxy group of cellulose and a polyolefin resin having a carboxy group and a crosslinked structure, wherein a content of a cellulose component in the ester-bonded composite resin is 9.0 to 42% by mass, and a tensile strength of a resin molded body formed with the cellulose-reinforced thermoplastic resin composition measured in accordance with JIS K 7161 is 40 MPa or more.

Further, it is preferable that the polyolefin resin having a carboxy group and a crosslinked structure is a polyolefin resin having a crosslinked structure such that a carbon atom in a main chain of the polyolefin resin modified by grafting an unsaturated carboxylic acid or an anhydride thereof and a carbon atom in a main chain of a polyolefin resin not modified with an unsaturated carboxylic acid or an anhydride thereof are bonded at two or more sites.

Further, it is preferable that a polyolefin resin before modification for obtaining the polyolefin resin modified by grafting an unsaturated carboxylic acid or an anhydride thereof and the polyolefin resin not modified with an unsaturated carboxylic acid or an anhydride thereof are different polyolefin resins.

Further, it is preferable that the cellulose is a plant-derived, fibrous cellulose.

Further, it is preferable that the molded article is a lamp body of a lighting appliance, a speaker unit, a connection box, a connector, a pulley, or a film for a house.

According to the present disclosure, a thermoplastic resin composition in which cellulose is uniformly dispersed and contained and a cellulose-reinforced thermoplastic resin composition Obtained by heating and kneading the thermoplastic resin composition are used, thereby enabling providing a molded article provided with a resin part having an improved mechanical strength.

DETAILED DESCRIPTION

Figure 1:
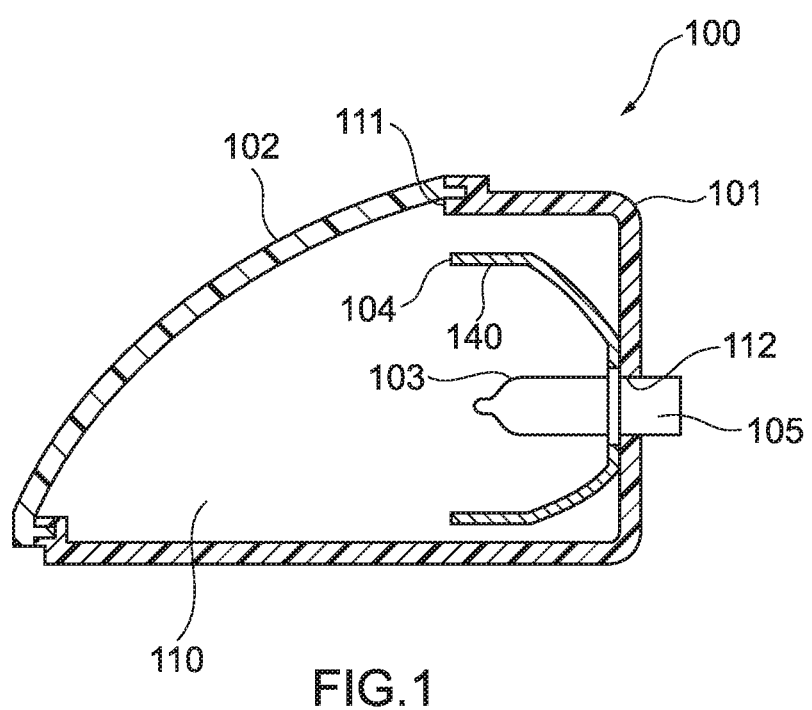
FIG. 1 is a schematic sectional diagram showing an example of a lamp body of a lighting appliance according o an embodiment of a molded article of the present disclosure.

A molded article according to an embodiment of the present disclosure, such as a lamp body of a lighting appliance, a speaker unit, a connection box, a connector, a pulley, or a film for a house, is provided with a resin part formed with a thermoplastic resin composition, the thermoplastic resin composition containing 5 to 70 parts by mass of cellulose based on 100 parts by mass of a thermoplastic resin and containing an organic peroxide, wherein a tensile strength of a resin molded body formed with the thermoplastic resin composition measured in accordance with JIS K 7161 is 40 MPa or more.

A cellulose-reinforced thermoplastic resin composition to be used in the present disclosure is obtained by heating and kneading the thermoplastic resin composition to react contained components. Therefore, a molded article according to another aspect of the present disclosure, such as a lamp body of a lighting appliance, a speaker unit, a connection box, a connector, a pulley, or a film for a house, is provided with a resin part formed with a cellulose-reinforced thermoplastic resin composition containing an ester-bonded composite resin (composite) of a hydroxy group of cellulose and a polyolefin resin having a carboxy group and a crosslinked structure, wherein a content of a cellulose component in the ester-bonded composite resin is 9.0 to 42% by mass, and a tensile strength of a resin molded body formed with the cellulose-reinforced thermoplastic resin composition measured in accordance with JIS K 7161 is 40 MPa or more.

According to the embodiments of the present disclosure, the thermoplastic resin composition in which cellulose is uniformly dispersed and contained and the cellulose-reinforced thermoplastic resin composition obtained by heating and kneading the thermoplastic resin composition are used, thereby enabling providing the molded article provided with the resin part having an improved mechanical strength. In addition, the resin part of the present disclosure is formed with the cellulose-reinforced thermoplastic resin composition formed with a thermoplastic resin and a cellulose reinforcing agent. Therefore, realizing molded articles provided with the resin part, such as a lamp body of a lighting appliance, a speaker unit, a connection box, a connector, a pulley, and a film for a house, which are reduced in weight and highly strengthened and are excellent in recyclability and surface smoothness is enabled.

<<Tensile Strength>>

The tensile strength of the resin molded body formed with the thermoplastic resin composition to be used in the present disclosure is a characteristic or a physical property of the resin contained in this thermoplastic resin composition. Such tensile strength is evaluated in such a way that the cellulose-reinforced thermoplastic resin composition obtained by heating and kneading the thermoplastic resin composition to react the contained components is processed into a test specimen (resin molded body) having an embodiment which is in accordance with the test specimen Type 2 and conforms to the tensile strength evaluation in JIS K 7127. On the other hand, the contained components in the cellulose-reinforced thermoplastic resin composition have already reacted, and therefore the tensile strength can be evaluated only by processing the cellulose-reinforced thermoplastic resin composition into a test specimen (resin molded body) having an embodiment which is in accordance with the test specimen Type 2 and conforms to the tensile strength evaluation in JIS K 7127.

To react the contained components in the thermoplastic resin composition by use of the organic peroxide as a radical polymerization initiator, the temperature in general may be equal to or higher than the temperature where the organic peroxide thermally decomposes and a radical reaction is initiated, specifically a one-minute half-life temperature of the organic peroxide or higher (preferably, a temperature that is higher than the one-minute half-life temperature by 20° C.). By heating and kneading the thermoplastic resin composition with a general twin-screw extruder, the cellulose-reinforced thermoplastic resin composition can be prepared as a pellet.

Hereinafter, the conditions of heating and kneading will be described, but these are not for specifying the method for producing the cellulose-reinforced thermoplastic resin composition to be used in the present disclosure, but are conditions for measuring the tensile strength which is a parameter as a physical property or a characteristic.

The temperature of kneading the thermoplastic resin composition is a temperature where the organic peroxide existing in the composition decomposes or higher, and is preferably a temperature that is higher than the one-minute half-life temperature of the organic peroxide to be used by 20° C. It is to be noted that stirring is not particularly limited, and may be sufficient when performed, for example, at a rotational speed of 100 rpm with a screw diameter of 15 mm and L/D=45. This heating-and-kneading may be performed with a heating and kneading machine as a model instead of a heating and kneading machine for use in production.

When heating-and-kneading is performed with a twin-screw extruder [for example, KZW15TW-45MG-NH manufactured by TECHNOVEL CORPORATION], the heating-and-kneading is performed at a screw rotational speed of 100 rpm loading the thermoplastic resin composition into a hopper of the twin-screw extruder having a screw diameter of 15 mm and L/D=45 with a feeder controlling each component by the mass to be supplied per hour and setting a barrel temperature in a kneading zone to a temperature higher than the one-minute half-life temperature of the organic peroxide by 20° C.

A test specimen for a tensile test in accordance with the test specimen Type 2 in JIS K 7127 is prepared from the cellulose-reinforced thermoplastic resin composition obtained by heating and kneading the thermoplastic resin composition to react the contained components, and the tensile strength is determined by measurement in accordance with JIS K 7161 for this test specimen for a tensile test.

It is to be noted that when heating-and-kneading is performed with a twin-screw extruder, the test specimen is prepared with an injection molding machine [for example, ROBOTSHOT α-30C manufactured by FANUC CORPORATION] after drying a pellet of the thermoplastic resin composition at 80° C. for 24 hours, the pellet obtained by performing the heating-and-kneading with the twin-screw extruder. The tensile strength is measured with a tensile tester [for example, Instron tester 5567 manufactured by Instron] under conditions of a distance between marked lines of 25 mm and a testing speed: 50 mm/min.

The tensile strength is preferable when it is higher, and is 40 MPa or more in the present disclosure, and the tensile strength is more preferably 45 MPa or more, still more preferably 50 MPa or more, and particularly preferably 55 MPa or more. It is to be noted that the upper limit of the tensile strength is realistically 100 MPa.

The tensile strength can be adjusted by the types and contents of the components contained in each of the above-described resin composition and cellulose-reinforced thermoplastic resin, and in particular, it is effective to adjust the amount of the organic peroxide to be compounded. For example, the tensile strength can be adjusted further effectively by using the amount of the organic peroxide to be compounded and the amount of a maleic anhydride-modified polyolefin to be compounded together in a well-balanced manner.

Hereinafter, description will be given from the thermoplastic resin composition in order.

<<Thermoplastic Resin Composition>>

The thermoplastic resin composition to be used for forming the resin part which the molded article of the present disclosure is provided with contains at least a thermoplastic resin, cellulose, and an organic peroxide. The thermoplastic resin composition may contain a polyolefin resin modified by grafting an unsaturated carboxylic acid or an anhydride thereof.

<Thermoplastic Resin>

In the present disclosure, one of the thermoplastic resins may be a polyolefin resin modified by grafting an unsaturated carboxylic acid or an anhydride thereof, or the thermoplastic resin consists of only a polyolefin resin modified by grafting an unsaturated carboxylic acid or an anhydride thereof.

[Base Resin]

A base resin refers to a resin component the content of which is largest among the thermoplastic resins other than the polyolefin resin modified by grafting an unsaturated carboxylic acid or an anhydride thereof, the thermoplastic resins contained in the thermoplastic resin composition, and may be contained at least in the same mass as the polyolefin resin modified by grafting an unsaturated carboxylic acid or an anhydride thereof. In addition, cellulose is not included in the thermoplastic resin.

The base resin to be used in the present disclosure is not particularly limited and may be any of the resins which are each generally used as a thermoplastic resin. Examples of the base resin include a polyolefin resin, a polyester resin, a polycarbonate resin, a polyimide resin, a polyimide resin, a polyurethane resin, a polyphenylene sulfide resin, a polyphenylene oxide resin, a cellulose acylate resin, and a phenoxy resin. Among these, a polyolefin resin is preferable in the present disclosure.

The polyolefin resin is a polyolefin resin obtained by polymerizing at least one olefin and may be a homopolymer or a copolymer. Examples of such an olefin include α-olefins having 4 to 12 carbon atoms, including ethylene, propylene, isobutylene, and isobutene (1-butene), butadiene, isoprene, a (meth)acrylate, (meth)acrylic acid, (meth)acrylamide, vinyl alcohol, vinyl acetate, vinyl chloride, styrene, and acrylonitrile.

Examples of the α-olefins having 4 to 12 carbon atoms include 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methyl ethyl-1-butene, 1-octene, methyl-1-pentene, ethyl-1-hexene, dimethyl-1-hexene, propyl-1-heptene, methyl ethyl-1-heptene, trimethyl-1-pentene, propyl-1-pentene, diethyl-1-butene, 1-nonene, 1-decene, 1-undecene and 1-dodecene.

Examples of the polyolefin resin include a polyethylene resin, a polypropylene resin, a polyisobutylene resin, a polyisobutene resin, a polyisoprene resin, a polybutadiene resin, a (meth)acrylic resin (so-called allyl resin), a polyvinyl chloride resin, a poly(meth)acrylamide resin, a polystyrene resin, an acrylonitrile/butadiene/styrene copolymer resin (ABS resin), an ethylene/(meth)acrylate copolymer, and an ethylene/vinyl acetate copolymer.

Among these resins, a polyethylene resin, a polypropylene resin, an acrylonitrile/butadiene/styrene copolymer resin (ABS resin) are preferable, more preferably a polyethylene resin and a polypropylene resin.

Examples of the polyethylene resin include an ethylene homopolymer and an ethylene-α-olefin copolymer. As the α-olefin, 1-butene, 1-pentene, 1-hexene, and 1-octene are preferable.

Examples of the ethylene-α-olefin copolymer include an ethylene-1-butene copolymer, an ethylene-1-pentene copolymer, an ethylene-1-hexene copolymer, and an ethylene-1-octene copolymer.

When the polyethylene resin is classified according to the density or the shape, polyethylene may be any of high density polyethylene (HDPE), low density polyethylene (LDPE), very low density polyethylene (VLDPE), linear low density polyethylene (LLDPE), and ultra high molecular weight-polyethylene (UHMW-PE).

Examples of the vinyl resin include vinyl chloride resins [such as homopolymers of a vinyl chloride monomer (such as a polyvinyl chloride resin) and copolymers of a vinyl chloride monomer and another monomer (such as a vinyl chloride-vinyl acetate copolymer and a vinyl chloride-(meth)acrylate copolymer)], vinyl alcohol resins (including homopolymers such as polyvinyl alcohol, copolymers such as an ethylene-vinyl alcohol copolymer, and the like), and polyvinyl acetal resins such as polyvinyl formal. These vinyl-based resins can be used singly, or two or more thereof can be used in combination.

It is preferable that the thermoplastic resin forming the cellulose-reinforced thermoplastic resin composition to be used for forming the resin part which the molded article of the present disclosure is provided with be a crosslinkable polyolefin resin. Examples of the crosslinkable polyolefin resin include low density polyethylene, middle density polyethylene, high density polyethylene, linear low density polyethylene, linear very low density polyethylene, an ethylene-propylene block copolymer, an ethylene-propylene random copolymer, an ethylene-butene block copolymer, an ethylene-butene random copolymer, an ethylene-vinyl acetate copolymer, an ethylene-methyl methacrylate copolymer, an ethylene-methyl acrylate copolymer resin, an ethylene-ethyl acrylate copolymer resin, and an ethylene-butyl acrylate copolymer resin.

The polyolefin resin which is the base resin may be used singly, or two or more of the polyolefin resins each of which is the base resin may be used in combination. It is to be noted that when a plurality of polyolefin resins are used, the amounts of the other components to be compounded are specified assuming the total amount of the polyolefin resins to be 100 parts by mass of the polyolefin resins, unless otherwise noted.

The melt flow rate (MFR) of the polyolefin resin is usually 0.01 to 400 g/10 min and, from the viewpoint of enhancing mechanical strength and production stability, the melt flow rate of the polyolefin resin is preferably 1 to 400 g/10 min, more preferably 0.1 to 50 g/10 min, and still more preferably 0.4 to 10 g/10 min. It is to be noted that in the present disclosure, the melt flow rate of the polyolefin resin, including the polyolefin resin modified by grafting an unsaturated carboxylic acid or an anhydride thereof, refers to the mass (g/10min) of a polymer that flows out per 10 minutes at 190° C. under a load of 2.16 kg in accordance with. JIS K 7210.

[Polyolefin Resin Modified by Grafting Unsaturated Carboxylic Acid or Anhydride Thereof]

With respect to the base resin, for example, polyethylene, polypropylene, or polystyrene, which is a representative of the base resin, is formed from only carbon atoms and hydrogen atoms, and the hydrophobicity is extremely high. On the other hand, the surface of cellulose fiber is a surface which has a hydroxy group and has a high polarity, and therefore has a low compatibility with a highly hydrophobic thermoplastic resin, so that it is difficult to disperse the cellulose fiber uniformly. In the present disclosure, it is preferable to use the polyolefin resin modified by grafting an unsaturated carboxylic acid or an anhydride thereof in order to uniformly disperse a highly hydrophilic cellulose fiber, which has a hydroxy group which is a polar group, in the highly hydrophobic thermoplastic resin.

The carboxy group ($-CO_2H$) existing in the polyolefin resin modified by grafting an unsaturated carboxylic acid or an anhydride thereof and the $-C(=O)-O-C(=O)-$ bond based on the acid anhydride have a high affinity to and compatibility with the hydroxy group ($-OH$) on the surface of the cellulose fiber due to interactions, such as a hydrogen bond and a dipole interaction. On the other hand, the polyolefin part of the polyolefin resin modified by grafting an unsaturated carboxylic acid or an anhydride thereof as well as a hydrophobic thermoplastic resin has a high hydrophobicity and the structures thereof are similar, so that the polyolefin part has a high compatibility with and affinity to the hydrophobic thermoplastic resin. Therefore, dispersing the cellulose fiber uniformly in the thermoplastic resin is facilitated.

The polyolefin resin modified by grafting an unsaturated carboxylic acid or an anhydride thereof has a partial structure of interacting with the hydrophobic thermoplastic resin and a partial structure of interacting with hydrophilic cellulose in a molecule thereof, as described above, thereby functioning as a mediator to bind the hydrophobic thermoplastic resin and the hydrophilic cellulose together, and therefore is classified as a coupling agent.

In addition, the structural part of an unsaturated carboxylic acid or the anhydride thereof in the polyolefin resin modified by grafting an unsaturated carboxylic acid or an anhydride thereof exists at an extremely near distance from the hydroxy group on the surface of the cellulose fiber, as described above. Therefore, an esterification reaction with the hydroxy group of the cellulose occurs easily and efficiently, and thereby a composite resin in which the cellulose and the polyolefin resin modified by grafting an unsaturated carboxylic acid or an anhydride thereof are chemically bonded is formed.

In the present disclosure, a crosslinking reaction progresses between the base resin and cellulose of the cellulose fiber due to a radical obtained by decomposition of the organic peroxide, so that a firm composite resin is formed. Further, when the thermoplastic resin contains the polyolefin resin modified by grafting an unsaturated carboxylic acid or an anhydride thereof, the organic peroxide allows a crosslinked structure, which is formed due to the radical reaction between the polyolefin resin modified by grafting an unsaturated carboxylic acid or an anhydride thereof and the base resin, to be formed. Thereby, the cellulose, the polyolefin resin modified by grafting an unsaturated carboxylic acid or an anhydride thereof, and the base resin are chemically bonded (covalently bonded) to each other and a firmer composite resin is formed.

The unsaturated carboxylic acid or the anhydride of thereof, which graft-modifies a polyolefin resin, in the polyolefin resin modified by grafting an unsaturated carboxylic acid or an anhydride thereof may be a chain compound or a cyclic compound, but is preferably a cyclic compound, more preferably a cyclic unsaturated carboxylic anhydride.

With respect to the amount of graft modification with the unsaturated carboxylic acid or the anhydride thereof, 0.1 to 25 parts by mass of the unsaturated carboxylic acid or the anhydride thereof based on 100 parts by mass of the unmodified polyolefin resin is preferable, more preferably 0.1 to 10 parts by mass, and still more preferably 0.1 to 4 parts by mass.

Examples of the unsaturated carboxylic acid include maleic acid, fumaric acid, itaconic acid, acrylic acid, and methacrylic acid.

Examples of a cyclic acid anhydride among the unsaturated carboxylic anhydrides include acid anhydrides having a maleic acid skeleton, such as maleic anhydride, citraconic anhydride (methylmaleic anhydride), 2,3-dimethylmaleic anhydride, 2-(2-carboxyethyl)-3-methylmaleic anhydride, 2-cyclohexane-1,2-dicarboxylic anhydride, phenylmaleic anhydride, 2,3-diphenylmaleic anhydride, 5,6-dihydro-1,4-dithiol-2,3-dicarboxylic anhydride, and 2,3-bis(2,4,5-trimethyl-3-thienyl)maleic anhydride, and acid anhydrides having a phthalic acid skeleton, such as 4-ethynylphthalic anhydride, 4,4'-(ethin-1,2-diyl)diphthalic anhydride, 4-(1-propynyl)phthalic anhydride, and 4-phenylethynylphthalic anhydride.

Examples of a chain acid anhydride among the unsaturated carboxylic anhydrides include an acid anhydride of fumaric acid, itaconic acid, acrylic acid, or methacrylic acid, and mixed acid anhydrides of these unsaturated carboxylic acids with a saturated aliphatic carboxylic acid, an aromatic carboxylic acid, or a heterocyclic carboxylic acid.

It is preferable that the unsaturated carboxylic anhydride be a cyclic unsaturated carboxylic anhydride, more preferably an acid anhydride having a maleic acid skeleton, and particularly preferably maleic anhydride.

It is preferable that thermoplastic resin composition to be used in the present disclosure contain a polyolefin resin modified by grafting an unsaturated carboxylic acid or an anhydride thereof and the polyolefin resin modified by grafting an unsaturated carboxylic acid or an anhydride thereof be a maleic anhydride-modified poly olefin resin.

The polyolefin of the maleic anhydride-modified polyolefin is not particularly limited as long as the compatibility with the base resin is good. It is preferable that the maleic anhydride-modified polyolefin be maleic anhydride-modified polyethylene, maleic anhydride-modified polypropylene, or maleic anhydride-modified polystyrene, and the maleic anhydride-modified polyolefin is more preferably maleic anhydride-modified polyethylene or maleic anhydride-modified polypropylene. It is to be noted that a maleic anhydride-modified copolymer of a copolymer of two selected from ethylene, propylene, and styrene is also preferable.

Examples of the maleic anhydride-modified polyethylene and the maleic anhydride-modified polypropylene include an ethylene-propylene copolymer modified with maleic anhydride, ethylene-α-olefin copolymers (such as an ethylene-vinyl acetate copolymer, an ethylene-hexene copolymer, and an ethylene-octene copolymer) modified with maleic anhydride, and styrenelethyleneibutylene/styrene (SEBS) having a group containing maleic anhydride. In addition, the maleic anhydride-modified polyethylene and the maleic anhydride-modified polypropylene may contain not only maleic anhydride but also a polar group (an alkylene glycol-based or (meth)acrylic acid-based monomer component) as a polar group to be grafted or copolymerized. Among these, particularly preferred maleic anhydride-modified polyethylene and maleic anhydride-modified polypropylene are maleic anhydride-modified polyolefins (polyethylene, polypropylene, polystyrene, or copolymers thereof), an ethylene-propylene copolymer modified with maleic anhydride, ethylene-α-olefin copolymers (such as an ethylene-vinyl acetate copolymer, an ethylene-hexene copolymer, and an ethylene-octene copolymer) modified with maleic anhydride, and styrene/ethylene/butylene/styrene (SEBS) having a group containing maleic anhydride.

It is most preferable that the maleic anhydride-modified polyolefin resin be a maleic anhydride-modified polyethylene. In particular, a maleic anhydride-modified polyethylene having a melt flow rate (MFR) at 190° C. under a load of 2.16 kg of 0.3 to 10 g/10 min is preferable. In addition, a maleic anhydride-modified polyethylene having a relative intensity ratio in an infrared absorption spectrum of 0.1 to 0.2, the relative intensity ratio measured in the infrared absorption spectrum, is preferable.

With respect to the relative intensity ratio in the infrared absorption spectrum, the maleic anhydride-modified polyethylene is hot-pressed at 150° C. and 200 kgf/cm$^2$ for 5 minutes to prepare a film having a thickness of 100 μm, and the infrared absorption spectrum of this film is measured. The relative intensity ratio in the infrared absorption spectrum can be measured by determining the relative intensity ratio of the maleic anhydride-modified polyethylene from a ratio of absorption intensity at around 1791 cm$^{-1}$ (an absorption peak of C=O stretching vibration of a saturated 5-membered ring acid anhydride derived from maleic anhydride)/absorption intensity at around 719 cm$^{-1}$ (an absorption peak of rocking vibration of a methylene group derived from polyethylene).

When the relative intensity ratio in the infrared absorption spectrum is 0.1 to 0.2, the thermoplastic resin can thereby be allowed to tightly adhere to the cellulose firmly at the interface between the two. The relative intensity ratio in the infrared absorption spectrum is more preferably 0.15 to 0.2.

With respect to the polyolefin resin modified by grafting an unsaturated carboxylic acid or an anhydride thereof, it is preferable that a polyolefin resin before modification and a polyolefin base resin not modified with an unsaturated carboxylic acid or an anhydride thereof be different polyolefin resins. Being different herein includes a difference in the types of resin components and in the constituent monomer components, and a difference in a physical property such as the MFR. In addition, the thermoplastic resin to be used in the present disclosure may be a mixed resin of the polyolefin resin modified by grafting an unsaturated carboxylic acid or an anhydride thereof and the polyolefin resin not modified with an unsaturated carboxylic acid or an anhydride thereof.

It is preferable that the content of the polyolefin resin modified by grafting an unsaturated carboxylic acid or an anhydride thereof be 0.5 to 20 parts by mass, more preferably 1 to 15 parts by mass, and still more preferably 1 to 10 parts by mass based on 100 parts by mass of the base resin. When the content of the polyolefin resin modified by grafting an unsaturated carboxylic acid or an anhydride thereof is too small, a tight adhesion effect at the interface of the cellulose and the resin is not obtained sufficiently, so that an effect of improving the mechanical strength of the resin composition is not obtained sufficiently. On the other hand, when the content of the polyolefin resin modified by grafting an unsaturated carboxylic acid or an anhydride thereof is too large, the content gives a bad influence on the strength of the base resin, so that the strength of the whole resin composition is lowered.

<Organic Peroxide>

The organic peroxide is a polymerization initiator that crosslinks polymer molecules of the thermoplastic resins, such as the base resin and the polyolefin resin modified by grafting an unsaturated carboxylic acid or an anhydride thereof, by a radical reaction. The organic peroxide is a compound having at least carbon atoms and an —O—O— bond, and examples thereof include a ketone peroxide, a peroxyketal, a hydroperoxide, a dialkyl peroxide, an acyl peroxide, an alkyl peroxyester, a diacyl peroxide, a monoperoxycarbonate, and a peroxydicarbonate. Among these, in the present disclosure, at least one organic peroxide selected from a peroxyketal, a dialkyl peroxide, a diacyl peroxide, an alkyl peroxyester, and a monoperoxycarbonate is preferable, and a dialkyl peroxide in particular is preferable. When the organic peroxide is represented by a formula, the organic peroxides represented by the following formulas (1) to (9) are preferable.

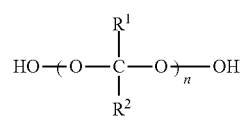

Formula (1)

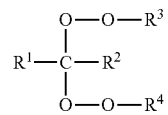

Formula (2)

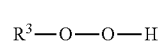

Formula (3)

$R^3-O-O-H$

Formula (4)

$R^3-O-O-R^4$

Formula (5)

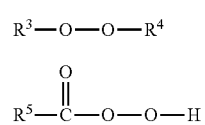

Formula (6)

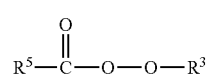

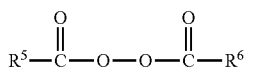

Formula (7)

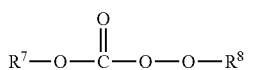

Formula (8)

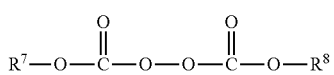

Formula (9)

In the formulas, $R^1$ to $R^8$ each independently represent an alkyl group, a cycloalkyl group, or an aryl group. $R^1$ and $R^2$, and $R^3$ and $R^4$ herein are optionally bonded to each other to form a ring. n represents an integer of 1 to 6.

The alkyl group may be linear or branched. It is preferable that the carbon numbers of the alkyl group be 1 to 20, more preferably 1 to 12. It is preferable that the number of ring members of the cycloalkyl group be 3 to 7, more preferably 5 or 6. It is preferable that the carbon numbers of the cycloalkyl group be 3 to 20, more preferably 3 to 12. Examples of the cycloalkyl group include cyclopropyl, cyclopentyl, and cyclohexyl.

The alkyl group and the cycloalkyl group optionally have a substituent, and examples of the substituent include an alkyl group, an alkenyl group, an alkynyl group, a cycloalkyl group, an aryl group, an alkoxy group, an aryloxy group, an acyl group, an acyloxy group, an alkyloxycarbonyl group, an aryloxycarbonyl group, a halogen atom, and a carboxy group.

It is preferable that the carbon numbers of the aryl group be 6 to 20, more preferably 6 to 12. The aryl group optionally has a substituent, and examples of the substituent include an alkyl group, a cycloalkyl group, an aryl group, an alkoxy group, an aryloxy group, and a halogen atom. Examples of the aryl group include phenyl and naphthyl, and phenyl is preferable.

It is preferable that the ring formed in such a way that $R^1$ and $R^2$ are bonded to each other be a 5- or 6-membered saturated carbon ring, and be a cyclopentane ring or a cyclohexane ring. It is preferable that the ring formed in such a way that $R^3$ and $R^4$ are bonded to each other be a 7- to 12-membered ring, and a bond forming the ring optionally contains —O—O—.

It is preferable that the organic peroxide represented by formula (2) also be a bis form as shown in the following formula (2a) in which $R^1$ and $R^2$ are bonded to each other to form a ring.

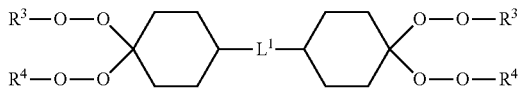

Formula (2a)

In the formula, $R^3$ and $R^4$ are as defined for $R^3$ and $R^4$ in formula (2), and preferred ranges thereof are also the same. $L^1$ represents a divalent linking group, and it is preferable that $L^1$ be —O—, —S—, —SO$_2$—, —C(=O)—, an alkylene group, or an arylene group.

It is preferable that the organic peroxide represented by formula (4) also be a bis form as shown in the following formula (4a) when $R^4$ is an alkyl group having a substituent.

$(R^3-O-O-R^{4a})_2$-$L^2$          Formula (4a)

In the formula, $R^3$ is as defined for $R^3$ in formula (4), and preferred ranges thereof are also the same. $R^{4a}$ represents an alkylene group, a cycloalkylene group, or an arylene group, $L^2$ represents a divalent linking group, and it is preferable that $L^2$ be —O—, —S—, —SO$_2$—, —C(=O)—, an alkylene group, an ethenylene group, an ethynylene group, or an arylene group.

Among the organic peroxides represented by formulas (1) to (9), the organic peroxides represented by formulas (2), (4), and (6) to (8) are preferable, and the organic peroxide represented by formula (4) in particular is preferable.

Examples of the organic peroxide include the following specific examples.

(1) Ketone Peroxide Compounds

Cyclohexanone peroxide, chain methyl ethyl ketone peroxide, and the like (2) Peroxyketal Compounds 1,1-Bis(t-butylperoxy)-3,3,5-trimethylcyclohexane, 1,1-bis(t-butylperoxy)cyclohexane, 2,2-bis(t-butylperoxy)octane, n-butyl-4,4-bis(t-butylperoxy)valerate, 2,2-bis(t-butylperoxy)butane, cyclic methyl ethyl ketone peroxide, and the like (3) Hydroperoxide Compounds t-Butyl peroxide, t-butyl cumyl peroxide, and the like (4) Dialkyl Peroxide Compounds Di-t-butyl peroxide, t-butyl cumyl peroxide, dicumyl peroxide, α,α'-bis(t-butylperoxy-m-isopropyl)benzene, 2,5-dimethyl(t-butylperoxy)hexane, 2,5-dimethyl-2,5-di(t-butylperoxy)hexine-3, and the like (5) Acyl Peroxide Compounds Acethyl peroxide, isobutyryl peroxide, octanoyl peroxide, decanoyl peroxide, lauroyl peroxide, 3,5,5-trimethylhexanoyl peroxide, succinic acid peroxide, benzoyl peroxide, 2,4-dichlorobenzoyl peroxide, m-toluoyl peroxide, and the like (6) Alkyl Peroxyester Compounds t-Butyl peroxyacetate, t-butyl peroxyisobutyrate, t-butyl peroxypivalate, t-butyl peroxyneodecanoate, cumyl peroxyneodecanoate, t-butyl peroxy-2-ehtylhexanoate, t-butyl peroxy-3,5,5-trimethylhexanoate, t-butyl peroxylaurate, t-butyl peroxybenzoate, di-t-butyl peroxyisophthalate, 2,5-dimethyl-2,5-di(benzoylperoxy)hexane, t-butyl peroxy maleic acid, t-butyl peroxy isopropyl carbonate, cumyl peroxyoctoate, t-hexyl peroxyneodecanoate, t-hexyl peroxypivalate, t-butyl peroxyneohexanoate, t-hexyl peroxyneohexanoate, cumyl peroxyneohexanoate, and the like (7) Diacyl Peroxide Compounds Diacetyl peroxide, diisobutyryl peroxide, dioctanoyl peroxide, didecanoyl peroxide, dilauroyl peroxide, bis(3,5,5-trimethylhexanoyl) peroxide, dibenzoyl peroxide, bis(2,4-dichlorobenzoyi) peroxide, bis(m-toluoyl) peroxide, and the like (8) Monoperoxycarbonate Compounds t-Butylperoxy isopropyl carbonate, t-amylperoxy-2-ethylhexyl carbonate, and the like (9) Peroxydicarbonate Compounds Di-n-propyl peroxydicarbonate, diisopropyl peroxydicarbonate, di-s-butyl peroxydicarbonate, bis(4-t-butylcyclohexyl) peroxydicarbonate, bis(2-ethylhexyl) peroxydicarbonate, and the like It is preferable that the one-minute half-life temperature of the organic peroxide be 130 to 190° C. The half-life of the organic peroxide herein refers to a time until the amount of active oxygen in the organic peroxide becomes half the amount before decomposition when the organic peroxide decomposes due to heat. When the one-minute half-life temperature of the organic peroxide is too high, setting the temperature in a twin-screw extruder is made difficult, and conversely when the one-minute half-life temperature is too low, the organic peroxide itself is unstable and decomposes during storage. By setting the one-minute half-life temperature to the range as described above, heating-and-kneading is enabled with a twin-screw extruder which is used usually, enabling dispersing cellulose uniformly in a highly hydrophobic resin.

The one-minute half-life temperature of the organic peroxide is determined by preparing an organic peroxide solution having a concentration of 0.1 mol/L using a relatively inactive solvent, such as benzene, and measuring a change in the organic peroxide concentration with time when the organic peroxide is thermally decomposed (see "Kakyozai Handbook (Handbook of Crosslinking Agents) (first edition)" published by TAISEISHA, LTD., page 162).

It is preferable that the content of the organic peroxide be 0.01 to 0.30 parts by mass, more preferably 0.05 to 0.20 parts by mass, and still more preferably 0.05 to 0.1 parts by mass based on 100 parts by mass of the thermoplastic resin. When the content of the organic peroxide is too small, an effect of improving the mechanical strength of the resin composition is not obtained sufficiently. On the other hand, when the content of the organic peroxide is too large, the thermal fluidity of the resin composition is lowered, making it difficult to perform processing by molding.

RO (A radical) which is obtained by decomposition of the organic peroxide abstracts a hydrogen atom of the base resin and of the cellulose to produce radicals of the base resin and the cellulose further. It is inferred that the produced radical of the base resin and the produced radical of the cellulose undergo a bonding reaction and thereby the base resin and the cellulose adhere to each other at the interface thereof. The above-described tight adhesion reaction at the interface is as follows when a case where the base resin is polyethylene is taken as an example.

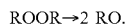
ROOR→2 RO.

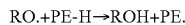
RO.+PE-H→ROH+PE.

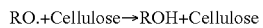
RO.+Cellulose→ROH+Cellulose

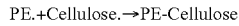
PE.+Cellulose.→PE-Cellulose

Herein, PE-H represents polyethylene, Cellulose-H represents cellulose, PE- and Cellulose-each represent a produced radical.

<Cellulose>

It is preferable that the cellulose to be used in the present disclosure be plant-derived fibrous cellulose, especially plant-derived, micro-fibrous cellulose. In the molded article provided with a resin part of the present disclosure, for example, a lamp body of a lighting appliance, a speaker unit, a connection box, a connector, a pulley, a film for a house, or the like, cellulose is used as a compounding material for the resin part, weight reduction and high strengthening can be achieved, and recyclability and surface smoothness of the molded article can be improved. Further, for example, when the embodiment of the molded article is like a film, a film for a house, as a molded article, can possess an improved surface smoothness by including a layer of the thermoplastic resins in which such fibrous cellulose is composited, and a film for a house possessing an excellent light permeability can thereby be obtained. In addition, cellulose is a polar molecule having an —OH group, and the affinity between molecules is therefore high. Thus, a film for a house excellent in adhesion performance can be obtained because the interfacial adhesive force of the film for a house is improved. Thereby, an advantageous point, such as, for example, that the film for a house, when broken, can simply be repaired with an adhesive tape or the like, is obtained.

Pulp is a raw material for paper and contains as the main component a tracheid which is extracted from a plant. From the chemical viewpoint, the main component of pulp is a polysaccharide, and the main component of the polysaccharide is cellulose. The plant-derived fibrous cellulose is not particularly limited, and examples thereof include plant-derived cellulose such as wood, bamboo, hemp, jute, kenaf, harvest losses of farm products (for example, straw of wheat, rice, or the like, maize, stems of raw cotton or the like, sugarcane), cloth, regenerated pulp, and old paper; however, in the present disclosure, wood or wood-derived fibrous cellulose is preferable, and the plant-derived fibrous cellulose is particularly preferably craft pulp. It is to be noted that the craft pulp is a general term of pulp obtained by removing lignin/hemicellulose from wood or a plant raw material by a chemical treatment with caustic soda or the like to take out cellulose that is almost pure.

It is preferable that the diameter of the cellulose to be used in the present disclosure be 1 to 30 μm, more preferably 1 to 20 μm, and still more preferably 5 to 15 μm. In addition, it is preferable that the length (fiber length) be 10 to 100 μm, more preferably 20 to 50 μm.

In the present disclosure, the amount of the cellulose to be compounded is 5 to 70 parts by mass, more preferably 0 to 60 parts by mass, and still more preferably 10 to 30 parts by mass based on 100 parts by mass of the thermoplastic resin. When the amount of the cellulose to be compounded is less than 5 parts by mass, a sufficient effect of reinforcement of a resin is not obtained, and conversely, when the amount of the cellulose to be compounded exceeds 70 parts by mass, the thermal fluidity of the resin composition is lowered, so that the molding processability is deteriorated, and the mechanical strength is lowered in some cases according to the circumstances.

<Additional Additive>

To the thermoplastic resin composition to be used in the present disclosure, an inorganic filler, such as, for example, talc, calcium carbonate, mica, and a glass fiber, or an organic filler, such as, for example, a polyester, and a polyimide fiber, and besides, various additives, such as a flame retardant, a stabilizer, an antioxidizing agent, an infrared ray absorber, a plasticizer, and a lubricant, and a colorant, such as a dye and a pigment, can be added.

A component forming the thermoplastic resin composition to be used in the present disclosure can be compounded in an amount within a general range, except that 5 to 70 parts by mass of cellulose based on 100 parts by mass of the thermoplastic resin composition is contained, but it is most preferable that all the components be each compounded in an amount within a preferred range. However, the following remains unchanged: it is also a preferred aspect that a particular component is in a preferred range and the other components are each compounded in an amount within a general range.

<<Cellulose-Reinforced Thermoplastic Resin Composition and Method for Producing Cellulose-Reinforced Thermoplastic Resin Composition>>

The cellulose-reinforced thermoplastic resin composition to be used in the present disclosure is produced from the above-described thermoplastic resin composition. The cellulose-reinforced thermoplastic resin composition to be used in the present disclosure is such that by heating and kneading the above-described thermoplastic resin composition, the contained components have reacted. In the above-described reaction, the base resin and a hydrogen atom of the cellulose of the cellulose fiber react due to the organic peroxide which is a radical reaction initiator, so that a crosslinking reaction between the base resin and the cellulose fiber progresses. Further, when the thermoplastic resin contains a polyolefin resin modified by grafting an unsaturated carboxylic acid or an anhydride thereof, the polyolefin resin modified by grafting an unsaturated carboxylic acid or an anhydride thereof and the cellulose react, so that an ester bond of a hydroxy group of the cellulose and the polyolefin resin having a carboxy group and a crosslinked structure is formed.

Accordingly, the cellulose-reinforced thermoplastic resin composition to be used in the present disclosure has a crosslinked structure between the thermoplastic resin and the cellulose of the cellulose fiber, and further, contains an ester-bonded composite resin (composite) of a hydroxy group of the cellulose and the polyolefin resin having a carboxy group and a crosslinked structure. Herein, the content of the cellulose component in the ester-bonded composite resin is 9.0 to 42% by mass, and the tensile strength of a resin molded body formed with the cellulose-reinforced thermoplastic resin composition measured in accordance with JIS K 7161 is 40 MPa or more. It is to be noted that the content of the cellulose component in the composite is calculated as the cellulose component based on the total content of the thermoplastic resin component and the cellulose component each contained, as a component forming the composite, in the thermoplastic resin composition for obtaining the cellulose-reinforced thermoplastic resin composition.

Besides what is described above, the crosslinking reaction that is caused by the organic peroxide which is a radical reaction initiator also forms a crosslinked structure in which a carbon atom of the main chain in the polyolefin resin modified by grafting an unsaturated carboxylic acid or an anhydride thereof and a carbon atom of the main chain in the polyolefin resin not modified with an unsaturated carboxylic acid or an anhydride thereof are bonded at two or more sites.

Accordingly, it is preferable that the polyolefin resin having a carboxy group and a crosslinked structure be a polyolefin resin having a crosslinked structure in which a carbon atom of the main chain in the polyolefin resin modified by grafting an unsaturated carboxylic acid or an anhydride thereof and a carbon atom of the main chain in the polyolefin resin not modified with an unsaturated carboxylic acid or an anhydride thereof are bonded at two or more sites. It is to be noted that when the thermoplastic resin composition contains a polyolefin resin modified by grafting an unsaturated carboxylic acid or an anhydride thereof, the polyolefin resin modified by grafting an unsaturated carboxylic acid or an anhydride thereof is included in the components forming the composite.

On this occasion, the polyolefin resin before modification for obtaining the polyolefin resin modified by grafting an unsaturated carboxylic acid or an anhydride thereof and the polyolefin resin not modified with an unsaturated carboxylic acid or an anhydride thereof as well as those in the above-described thermoplastic resin composition may be different polyolefin resins.

In addition, it is preferable that the cellulose contained in the cellulose-reinforced thermoplastic resin composition as well as the cellulose contained in the above-described thermoplastic resin composition be plant-derived fibrous cellulose, especially plant-derived, micro-fibrous cellulose.

The cellulose-reinforced thermoplastic resin composition is produced by heating and kneading the thermoplastic resin composition as described above. The apparatus to be used in kneading-and-heating is not particularly limited as long as heating-and-kneading can be performed at a temperature where the organic peroxide thermally decomposes, and examples thereof include a blender, a kneader, a mixing roll, a Banbury mixer, and a single-screw or twin-screw extruder. Among these, a twin-screw extruder is preferable. The cellulose-reinforced thermoplastic resin composition can be obtained with a twin-screw extruder by directly loading each component into a hopper unit of the twin-screw extruder with a weight feeder, kneading loaded components with the twin-screw extruder setting the setting temperature of the kneading zone to the above-described temperature, and reacting this kneaded product while heating the kneaded product.

The cellulose-reinforced thermoplastic resin composition produced separately preparing the thermoplastic resin composition to be used in the present disclosure may be used, but it is preferable to produce the cellulose-reinforced thermoplastic resin composition in such a way that at a stage of producing the cellulose-reinforced thermoplastic resin composition with, for example, an extruder [for example, a twin-screw extruder such as KZW15TW-45MG-NH manufactured by TECHNOVEL, CORPORATION], each component is loaded into a hopper of the extruder with a feeder controlling each component by the mass to be supplied into this extruder per hour, and a resultant thermoplastic resin composition is heated and kneaded. In such a method, existing apparatuses and facilities can be used without changing the facilities, and the cellulose-reinforced thermoplastic resin composition can be produced simultaneously with the preparation of the thermoplastic resin composition.

As described above, heating-and-kneading is performed by loading each component into the hopper of the extruder and setting a barrel temperature in the kneading zone to, for example, a temperature where the organic peroxide thermally decomposes. The kneading temperature is set to a temperature higher than the one-minute half-life temperature of the organic peroxide. It is preferable that the kneading temperature be a temperature higher than the one-minute half-life temperature of the organic peroxide by 5° C. or more, more preferably a temperature higher by 10° C. or more, still more preferably a temperature higher by 15° C. or more, and most preferably a temperature higher by 20° C. or more.

When a general organic peroxide is used, it is preferable that the kneading temperature be 150 to 200° C.

With respect to heating-and-kneading, performing heating-and-kneading with, for example, a screw diameter of 15 mm and L/D=45 at a screw rotational speed of 100 rpm is sufficient. The kneading time is not particularly limited, and may be a general reaction time when a usual organic peroxide is used.

When the cellulose-reinforced thermoplastic resin composition is produced using an extruder, the cellulose-reinforced thermoplastic resin composition can also be used for producing a molded article, such as a lamp body of a lighting appliance, a speaker unit, a connection box, a connector, a pulley, or a film for a house, the molded article being provided with a resin part by making the cellulose-reinforced thermoplastic resin composition into a pellet.

It is to be noted that in the cellulose-reinforced thermoplastic resin composition to be used in the present disclosure, an organic peroxide is compounded, therefore a decomposition residue of the organic peroxide is left in some cases by performing heating-and-kneading to perform reaction, and as a result, the decomposition residue may be contained in the cellulose-reinforced thermoplastic resin composition.

<<Molded Article and Method for Producing Molded Article>>

The resin part of the molded article according to the present disclosure is formed using the cellulose-reinforced thermoplastic resin composition obtained by heating and kneading the thermoplastic resin composition to be used in the present disclosure. That is, the resin part is formed from the cellulose-reinforced resin composition containing an ester-bonded composite resin (composite) of a hydroxy group of cellulose and a polyolefin resin having a carboxy group and a crosslinked structure, wherein the content of the cellulose component in the ester-bonded composite resin is 9.0 to 42% by mass, and the tensile strength of a resin molded body formed with the cellulose-reinforced thermoplastic resin composition measured in accordance with JIS K 7161 is 40 MPa or more.

In the molded body provided with a resin part according to the present disclosure, the tight adhesion at the interface between the thermoplastic resin and cellulose is changed for the better by the use of the cellulose-reinforced thermoplastic resin composition, as described above. Therefore, the resin part of an obtained molded article is excellent in mechanical strength., such as, for example, tensile strength. The molded article of the present disclosure is, for example, a lamp body of a lighting appliance, a speaker unit, a connection box, a connector, a pulley, or a film for a house. When the molded article is a film for a house, the film for a house includes a layer formed with the thermoplastic resin composition.

<Lamp Body of Lighting Appliance>

FIG. 1 is a schematic sectional diagram showing an example of a lamp body of a lighting appliance according to an embodiment of the molded article. In FIG. 1, a configuration of a headlight (headlamp) as a lighting appliance for a vehicle is shown as an example of a lighting appliance 100. The lighting appliance 100 includes a lamp body 101, a front cover 102, a light source 103, a reflection mirror (reflector) 104, and a socket part 105. The lamp body 101 includes an opening 111 at the front. The front cover 102 is attached to the lamp body 101 in such a way as to cover the opening 111 of the lamp body 101. Thereby, a space 110 closed up tightly by the lamp body 101 and the front cover 102 is formed.

The light source 103 and the reflection mirror 104 are disposed in the space 110. The light source 103 is, for example, a LED light bulb or a halogen light bulb. The light source 103 is connected to the socket part 105 fixed in a through hole 112 formed in the lamp body 101 and emits light by electric power supplied from the socket part 105.

The reflection mirror 104 includes a concave surface 140 dented toward the front cover 102. A hole is formed at the central part of the reflection mirror 104, and the light source 103 is inserted and fixed in the hole. The reflection mirror 104 reflects the light emitted from the light source 103 by the concave surface 140 to lead the light on the side of the front cover 102.

The front cover 102 is formed from a light (visible light)-transmittable resin material. The front cover 102 also functions as a lens that condenses or diffuses light from the light source 103.

The lamp body 101 herein is provided with a resin part formed with the above-described thermoplastic resin composition. Thereby, weight reduction and high strengthening of the lamp body 101 can be achieved, and the recyclability and the surface smoothness can be improved.

The method of producing the lamp body 101 is not particularly limited, and the lamp body 101 can be molded by injection molding of injecting the thermoplastic resin composition into a metal mold. Thereby, the resistance against wear of a metal mold is improved, and a metal mold is made difficult to corrode.

FIG. 1 shows an example of a case where the whole of the lamp body 101 is formed by the resin part, but the lamp body 101 is not limited to this and may include the resin part and a part formed with a material other than a resin. In addition, FIG. 1 shows an example of a case where the lighting appliance 100 is a headlight; however, the lighting appliance 100 is not limited to this, and the lamp body 101 can be applied as a lamp body of a lighting appliance for a vehicle, such as a brake lamp, a fog lamp, and a reversing light. Further, the lamp body 101 can be applied as a body part (housing) of various lighting appliances, not limited to the lighting appliance for a vehicle.

<Speaker Unit>

Figure 2:
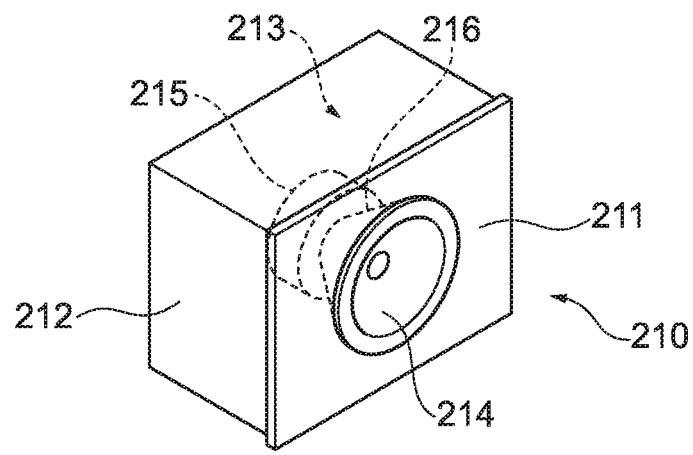
FIG. 2 is a perspective diagram showing an example of a speaker unit according to an embodiment of a molded article of the present disclosure.

FIG. 2 is a perspective diagram showing an example of a speaker unit according to an embodiment of the molded article. A speaker unit 210 is provided with: an almost tightly-closed case body (enclosure) 213 formed by a board-like baffle 211 and a box-like storing part 212 bonded to the back of the baffle 211; and a speaker 214 held by the case body 213 in such a way as to expose a sound-emitting surface to the surface of the baffle 211. It is to be noted that the case body (enclosure) 213 is also generally called a speaker box or a cabinet and has various shapes, such as a box type, a cylindrical type, and a conical type, depending on an apparatus or the like to which the case body 213 is applied. The speaker 214 includes: an exciter 215 as a source of vibration for a magnetic circuit; and cone paper 216 that releases a sound wave generated by the vibration of the exciter 215 outside the case body 213.

Figure 3:
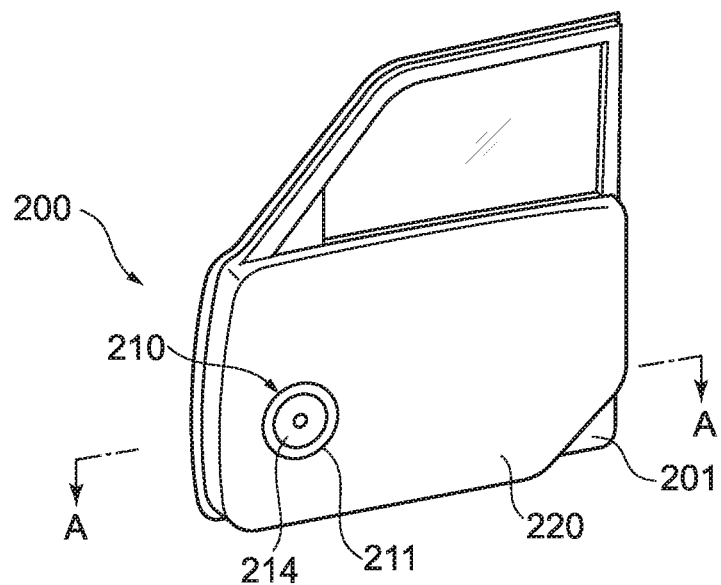
FIG. 3 is a perspective diagram showing an aspect of applying a speaker unit according to an embodiment of a molded article of the present disclosure to a speaker apparatus for automotive application.
Figure 4:
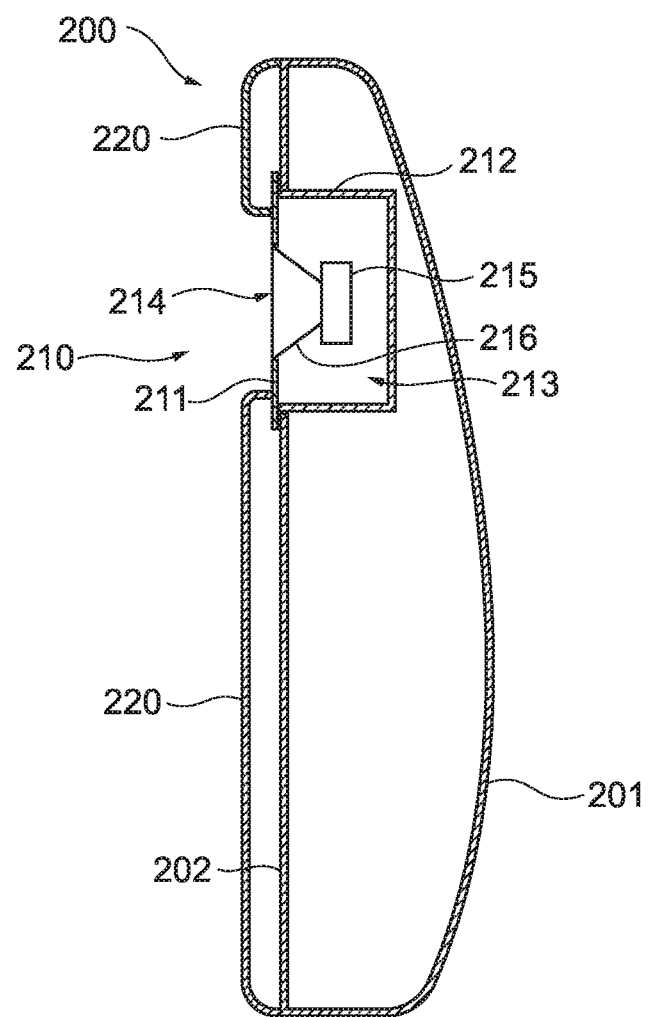
FIG. 4 is a sectional diagram of the speaker apparatus for automotive application Shown in FIG. 3, the sectional diagram viewed from the arrow direction along the line A-A in FIG. 3.

FIG. 3 is a perspective diagram showing a speaker apparatus 200 for automotive application, which is an embodiment of applying the speaker unit to a speaker apparatus for automotive application. FIG. 4 is a sectional diagram of the speaker apparatus 200 for automotive application shown in FIG. 3, the sectional diagram viewed from the arrow direction along the line A-A in FIG. 3. As shown in FIGS. 3 and 4, the speaker unit 210 to be used as the speaker apparatus 200 for automotive application is provided between an outer panel 201 on the vehicle outer side and an inner panel 202 on the vehicle inner side, the panels forming a door in a vehicle, such as an automobile, and is attached in a state where the speaker unit 210 is exposed from the opening of the inner panel 202. It is to be noted that to the inner panel 202, an inner trim 220 covering the surface of the inner panel 202 is attached in a state of exposing the speaker unit 210.

In the speaker unit 210 used for the speaker apparatus 200 for automotive application shown in FIGS. 2 to 4, the above-described thermoplastic resin composition is used for the baffle 211, the storing part 212, and the cone paper 216 of the case body 213. Thereby, weight reduction and improvements in strength characteristics and acoustic characteristics can be achieved in the speaker apparatus 200 for automotive application. The speaker unit 210 in particular can contribute to reducing fuel consumption of a vehicle due to the weight reduction and is made highly strong, and therefore vibration of the case body 213 caused by vibration of a vehicle can be suppressed. As a result, noise attributable to the vibration of the case body 213 can be reduced and the acoustic characteristics can be improved. In addition, the above-described thermoplastic resin composition is used for the speaker unit 210, and therefore the speaker unit 210 exhibits an excellent whitening resistance. Further, the speaker unit 210 includes the case body 213 formed with the thermoplastic resin composition and therefore is rich in recyclability and surface smoothness.

The object of applying the speaker unit is not limited to an automobile, and examples thereof include mobile objects such as a two-wheeled vehicle, a railroad vehicle, a plane, and a ship, a computer apparatus, a headphone, or all the speaker apparatuses to be installed for home-use.

<Connection Box and Connector>

Figure 5:
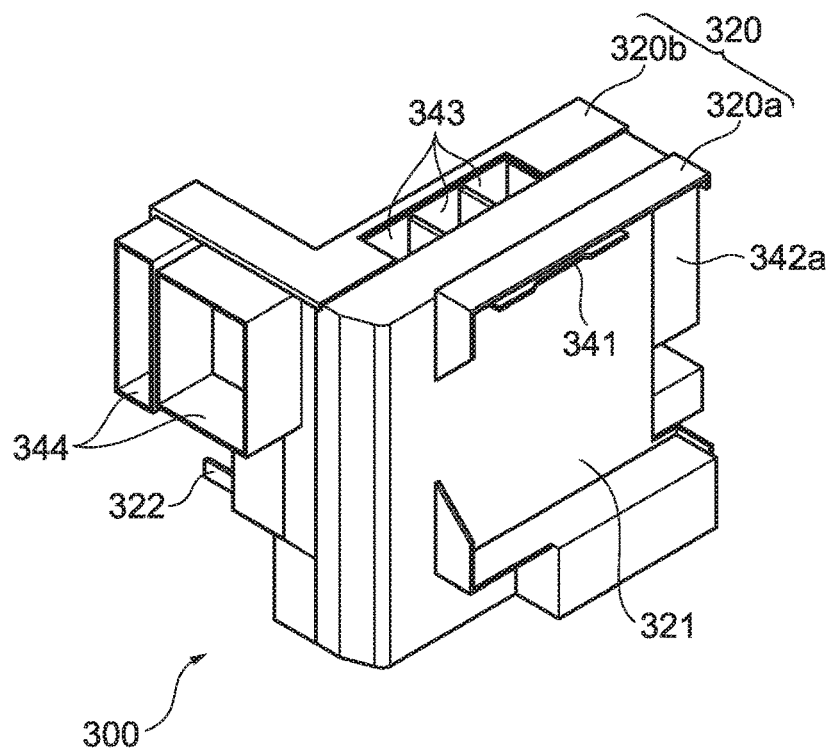
FIG. 5 is a perspective diagram showing an example of a connection box according to an embodiment of a molded article of the present disclosure.
Figure 6:
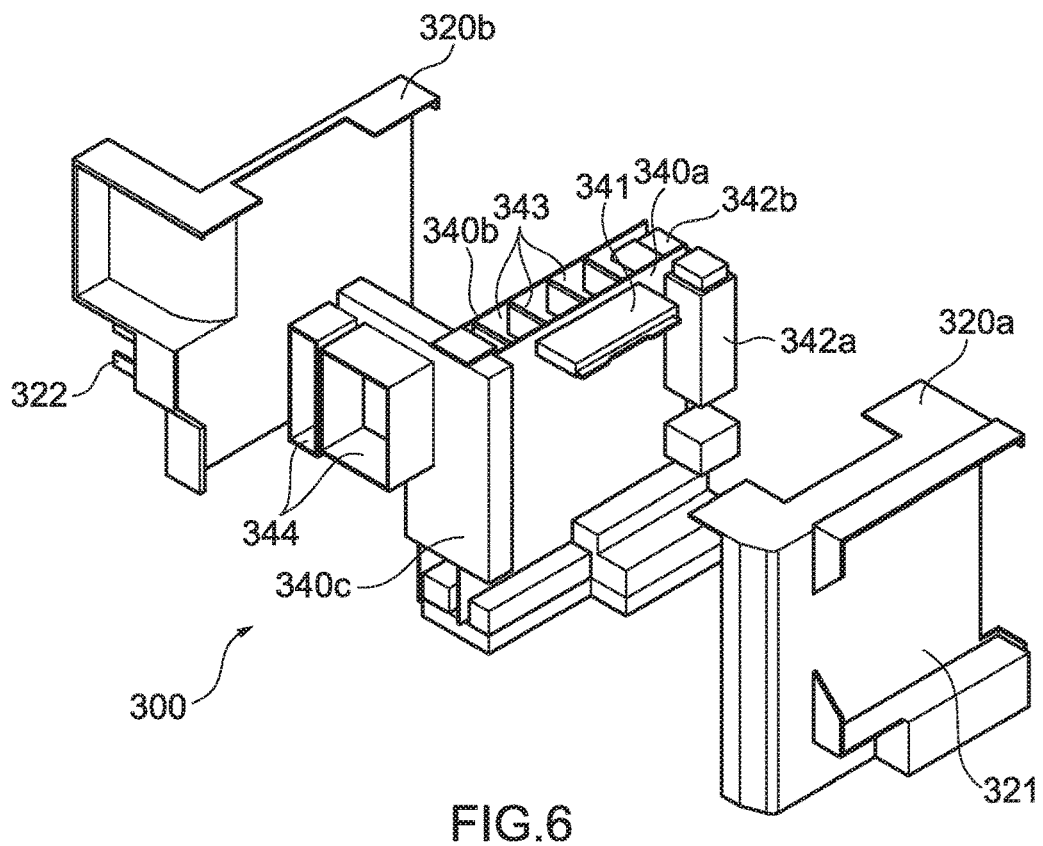
FIG. 6 is a disassembled perspective diagram of the connection box shown in FIG. 5.

FIG. 5 is a perspective diagram showing a connection box according to an embodiment of the molded article. FIG. 6 is a disassembled perspective diagram of the connection box shown in FIG. 5. A connection box 300 is formed, for example, as a junction box to be installed on the indoor side of an automobile. This connection box 300 is provided with a case 320 including a first case 320a and a second case 320b.

The connection box 300 is provided with a first substrate 340a, a second substrate 340b, and a third substrate 340c in the accommodating space inside thereof. The first substrate 340a and the second substrate 340b are disposed in such a way as to be in parallel with each other, and the third substrate 340c is disposed in such a way as to be vertically connected to end portions of the first substrate 340a and the second substrate 340b.

On a mounting surface 321 of the first case 320a, an electronic control unit (ECU: Electronic Control Unit) not shown in the figures is to be installed. A connector 341 for ECU of the first substrate 340a is disposed in such a way as to protrude from the mounting surface 321 and can electrically connect the circuit of the first substrate 340a to ECU.

From the end portion of the second case 320b, a connector 322 for mounting a relay, the connector integrated with the case 320 of the connection box 300, protrudes. A relay not shown in the figures can be mounted to the connector 322 for mounting a relay.

An indoor side connector 342a is disposed on the first substrate 340a, and an indoor side connector 342b is disposed on the second substrate 340b. These indoor side connectors 342a, 342b are each electrically connected to a circuit on the indoor side of an automobile through a wire harness not shown in the figures. A connector 343 for mounting a relay is disposed on the second substrate 340b. In the example shown in the figures, three relays can be loaded to the connector 343 for mounting a relay. An engine room side connector 344 is disposed on the third substrate 340c. This engine room side connector 344 is to be electrically connected to a circuit on the engine room side through a wire harness not shown in the figures.

In this way, the case 320 and connectors 322, 341 to 344 of the connection box 300 are formed using the thermoplastic resin composition, and therefore weight reduction and high strengthening can be achieved, and recyclability and surface smoothness can be improved.

The method of producing the connection box and the connector is not particularly limited, and the connection box and the connector can be molded by injection molding of injecting the thermoplastic resin composition into a metal mold. It is to be noted that the connector in the present disclosure includes a connector housing, the connector itself, a connector integrated with a connection box case, and the like.

Examples of the uses of the connection box and the connector include a material for transportation equipment, such as an automobile, a two-wheeled vehicle, a train, and an airplane, a structural member of a robot arm, parts for a robot for amusement, a material for a home electric appliance, a case body for office automation equipment, information processing equipment, and a portable terminal.

<Pulley>

Figure 7:
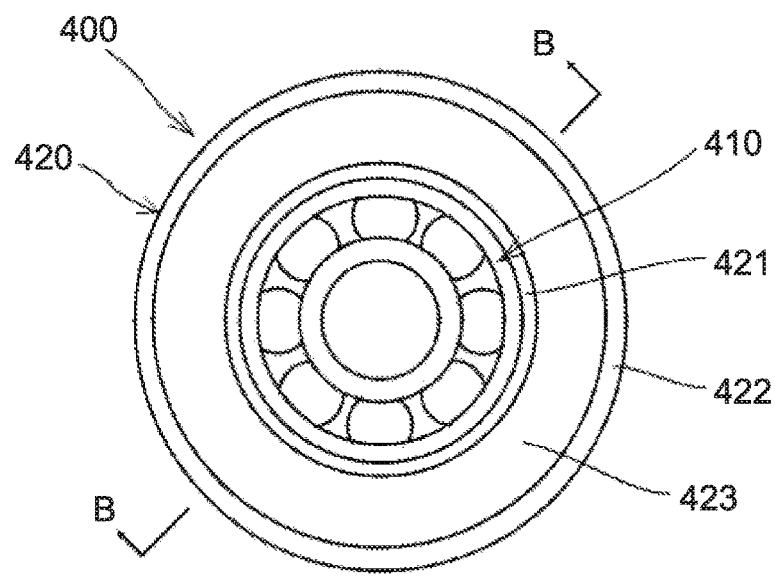
FIG. 7 is a front diagram showing an example of a pulley according to an embodiment of a molded article of the present disclosure.
Figure 8:
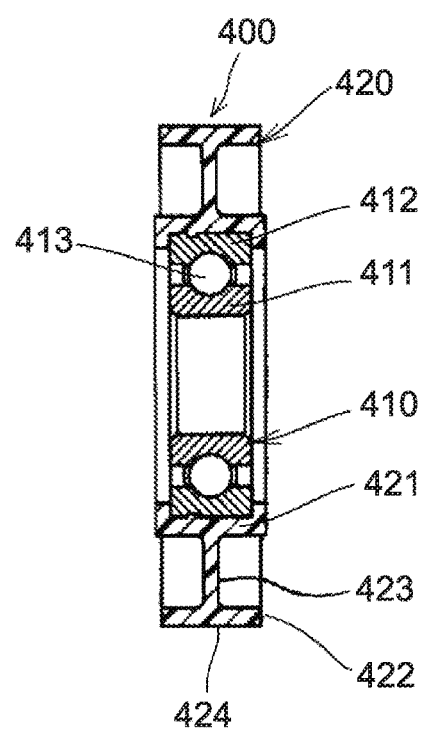
FIG. 8 is a sectional diagram of the pulley shown in FIG. 7, the sectional diagram taken along the line B-B in FIG. 7.

FIG. 7 shows a front diagram of a pulley according to an embodiment of the molded article, and FIG. 8 shows a sectional diagram of FIG. 7, the sectional diagram taken along the line B-B in FIG. 7. As shown in FIGS. 7 and 8, a pulley 400 is formed by a rolling bearing 410 and a resin part 420 integrally molded around the rolling bearing 410. The rolling bearing 410 includes an inner ring 411, an outer ring 412, and a rolling element 413 provided between the inner and outer rings. The resin part 420 is formed using the thermoplastic resin composition. The resin part 420 is provided with a cylindrical boss 421, a cylindrical rim 422, and an annular part 423 that connects the boss 421 and the rim 422. The outer peripheral surface 424 of the rim 422 is a guide surface of a belt not shown in the figures.

FIG. 7 shows an example where the resin part 420 is formed using the thermoplastic resin composition, but the whole pulley may be formed using the thermoplastic resin composition. This can contribute to weight reduction and high strengthening of the pulley 400. The method of producing the pulley 400 is not particularly limited, but the pulley 400 can be molded by injection molding of disposing the rolling bearing 410 in a metal mold and injecting the thermoplastic resin composition into the metal mold. Thereby, the resistance against wear of a metal mold and the smoothness of the edge (sharp-edge characteristic) of the resin part 420 can be improved. In addition, by performing injection molding using the thermoplastic resin composition, a pulley 400 which is reduced in weight and highly strengthened and is excellent in recyclability, surface smoothness, and further, size accuracy can be molded.

Examples of the use of the pulley include a material for transportation equipment, such as an automobile, a two-wheeled vehicle, a train, and an airplane, a structural member of a robot arm, parts for a robot for amusement, a material for a home electric appliance, a case body for office automation equipment, information processing equipment, and a portable terminal.

<Film for House>

Figure 9:
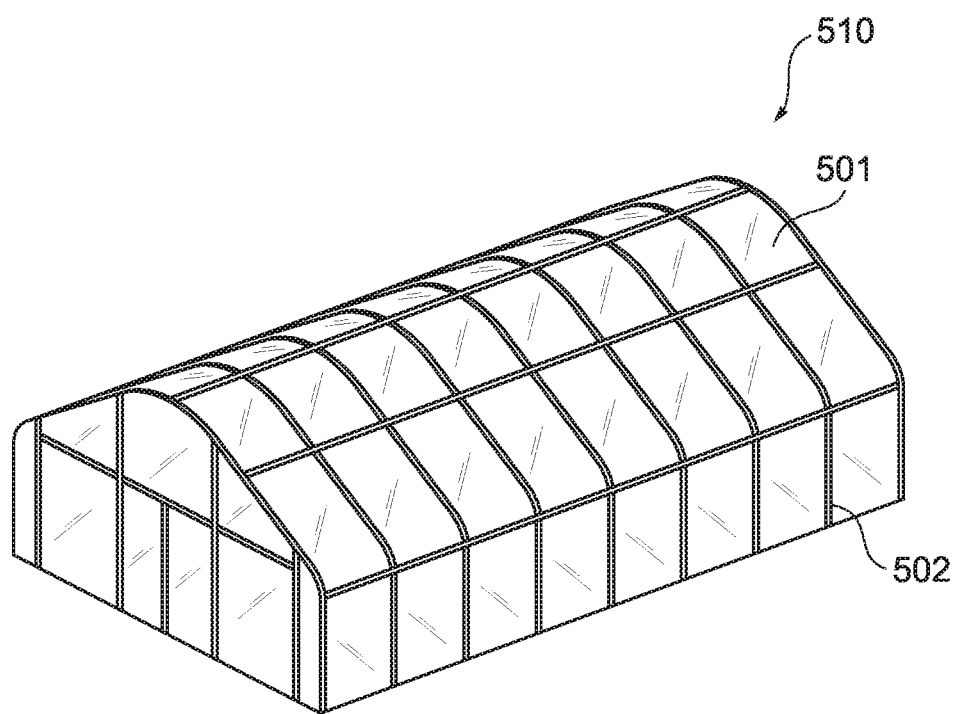
FIG. 9 is a perspective diagram Showing an example of a house for agriculture using a film for a house according to an embodiment of a molded article of the present disclosure.

FIG. 9 is a schematic perspective diagram showing an example of an appearance of an agricultural house to which a film for a house according to an aspect of the molded article is applied. As shown in FIG. 9, a house 510 for agriculture is provided with a film 501 stretched over a skeleton 502.

As shown in FIG. 9, the whole surface of the house 510 for agriculture is covered with the film 501 stretched over the skeleton 502. When the film 501 is stretched over the skeleton, the house for agriculture in which a space separated from the outside is thereby formed can be made.

The material forming the skeleton 502 is not particularly limited, and a conventionally known aggregate (such as, for example, steel material and steel pipe) for use in a plastic greenhouse can be used. The film 501 is a film to be stretched over the skeleton 502, and the above-described film for a house is applied to the film 501.

The house 510 for agriculture may be provided with ventilation means (not shown in the figure), such as, for example, a ventilation fan, to be provided at the ceiling or the side of a house. In addition, it is preferable that the doorway (not shown in the figure) for a worker who is engaged in work in the house 510 for agriculture be, for example, double-entry doors or the like such that the air outside cannot directly get into the space in the house.

The film 501 in the house 510 for agriculture includes a layer which is formed using the thermoplastic resin composition. Thereby, the film 501 possesses recyclability together with weight reduction and high strengthening, and further, the surface smoothness and the adhesion performance can be improved more than a conventional film.

The film 501 (film for a house) may include a layer which is formed from the thermoplastic resin composition and can be produced by a known method, such as, for example, an inflation molding method, a T-die molding method, a lamination method, and a calender method.

The film 501 (film for a house) may be a single-layered or multi-layered film including one layer or a plurality of layers which is or are formed using the thermoplastic resin composition, or a laminated film in which on a layer formed from the thermoplastic resin composition, a resin layer formed from another resin composition is laminated. Examples of the resin capable of forming the other resin layer which can be laminated on the layer formed from the thermoplastic resin composition include a polyolefin resin which is usually used for a use as a film for a house.

The thickness of the layer which is formed from the thermoplastic resin composition, the layer included in the film 501 (film for a house) is, for example, 50 μm or more and 200 μm or less, the lower limit value is preferably 75 μm or less, and it is preferable that the upper limit value be 150 μm or less. When the film for a house is a multi-layered film, the thickness of the film for a house can appropriately be set according to the use or the like.

FIG. 9 shows an example of a case where the film 501 (film for a house) is applied to the whole surface of the house 510 for agriculture, but the house 510 for agriculture is not limited to this and may be such that the film for a house is used in some of the surfaces of the house 510 for agriculture. In addition, the house 510 for agriculture can be prepared in such a way that a framework is built in desired width, depth, and height, and the film 501 (film for a house) obtained using the above-described thermoplastic resin composition is stretched over the skeleton 502. Thereby, a house 510 for agriculture which is reduced in weight and highly strengthened and is excellent in recyclability can be obtained.

Examples of the use of the film for a house include a house for gardening, a house for raising a living thing, a house for a terrace, and a simple warehouse, not limited to a house for agriculture, the house for cultivating plants.

EXAMPLES

Hereinafter, the present disclosure will be described in more detail based on Examples, but the present disclosure is not limited to these Examples. The materials used are shown below.

<Materials Used>
(1) Thermoplastic Resin
(Base Resin)
  High density polyethylene (HDPE)
    MFR (190° C./2.16 kg)=5 g/10 min
    Density=0.953 g/cm$^3$
(Maleic Anhydride-modified Polyethylene)
  Maleic anhydride-modified polyethylene A
    MFR (190° C./2.16 kg)=9.0 g/10 min
    Relative intensity ratio in infrared absorption spectrum=0.15
  Maleic anhydride-modified polyethylene B
    MFR (190° C./2.16 kg)=0.4 g/10 min
    Relative intensity ratio in infrared absorption spectrum=0.14
  Maleic anhydride-modified polyethylene C
    MFR (190° C./2.16 kg)=3.4 g/10 min
    Relative intensity ratio in infrared absorption spectrum=0.10
  Maleic anhydride-modified polyethylene D
    MFR (190° C./2.16 kg)=4.4 g/10 min
    Relative intensity ratio in infrared absorption spectrum=0.16
  Maleic anhydride-modified polyethylene E
    MFR (190° C./2.16 kg)=1.3 g/10 min.
    Relative intensity ratio in infrared absorption spectrum=0.17
  Maleic anhydride-modified polyethylene F MFR (190° C./2.16 kg)=1.2 g/10 min
    Relative intensity ratio in infrared absorption spectrum=0.16
  Maleic anhydride-modified polyethylene G
    MFR (190° C./2.16 kg)=1.1 g/10 min
    Relative intensity ratio in infrared absorption spectrum=0.12
(2) Cellulose
  Pulp [trade name KC FLOCK W-200 manufactured by Nippon Paper Industries Co., Ltd., powdered cellulose having an average particle diameter of about 32 μm]
(3) Organic Peroxide
  Peroxyketal [trade name PERHEXA C manufactured by NOF CORPORATION]
  Dialkyl peroxide A [trade name PERHEXA. 25B manufactured by NOF CORPORATION]
  Dialkyl peroxide B [trade name PERCUMYL D manufactured by NOF CORPORATION]
  Dialkyl peroxide C [trade name PERBUTYL D manufactured by NOF CORPORATION]
  Diacyl peroxide [trade name HYPER FF manufactured by NOF CORPORATION]
  Alkyl peroxyester [trade name PERBUTYL: A manufactured by NOF CORPORATION]
  Monoperoxycarbonate [trade name PERHEXYL I manufactured by NOF CORPORATION]

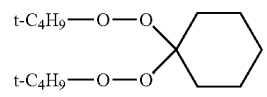

PERHEXA C

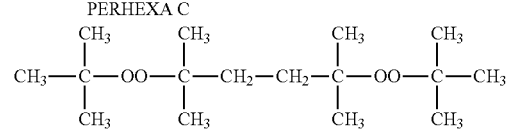

PERHEXA 25B

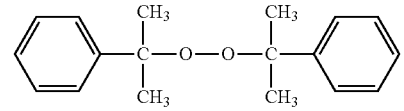

PERCUMYL D

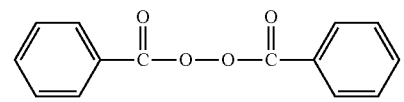

PERBUTYL D

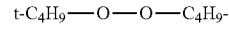

NYPER FF

-continued

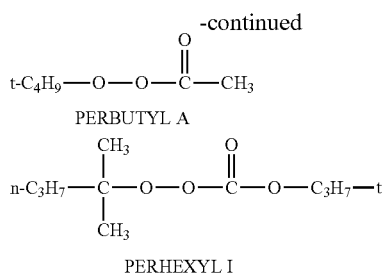

PERBUTYL A

PERHEXYL I

Firstly, common production method, molding method, and physical property evaluation method, which are performed in Examples and. Comparative Examples, will be described.

<Method for Producing Cellulose-reinforced Thermoplastic Resin Composition>

A thermoplastic resin composition, in which the above-described (1) thermoplastic resins (base resin and maleic anhydride-modified polyethylene), (2) cellulose, and (3) organic peroxide are each contained in a content shown in Table 1 to Table 10 below, was prepared. The obtained thermoplastic resin composition was loaded into a hopper of a twin-screw extruder [KZW15TW-45MG-NH manufactured by TECHNOVEL CORPORATION] having a screw diameter of 15 mm and L/D=45 with a feeder controlling the obtained thermoplastic resin composition by the mass to be supplied per hour. The barrel temperature was set to a temperature higher than the one-minute half-life temperature of the organic peroxide by 20° C. to perform heating-and-kneading at a screw rotational speed of 100 rpm, thereby obtaining a cellulose-reinforced thermoplastic resin composition. It is to be noted that when the thermoplastic resin contained a maleic anhydride-modified polyethylene, the maleic anhydride-modified polyethylene used was described as a coupling agent in Tables 1 to 25 for convenience.

<Method for Producing Molded Article Provided with Resin Part>

(Production of Lamp Body, Speaker Unit, Connection Box and Connector, and Pulley)

Injection molding was performed using the cellulose-reinforced thermoplastic resin composition prepared above to separately prepare a lamp body, a speaker unit, a connection box and a connector, and a pulley each provided with a resin part. It is to be noted that with respect to injection conditions, injection molding was carried out under the molding conditions which are generally regarded as suitable in injection molding of these molded articles.

(Production of Film for House)

A single-layered film having a thickness of 100 μm was prepared to obtain a film for a house by molding the cellulose-reinforced thermoplastic resin composition prepared above into a film using a T-die cast film production apparatus at an extruding temperature of 200° C.

<Method of Molding Test Specimen for Evaluating Tensile Strength>

Pellets of the cellulose-reinforced thermoplastic resin compositions obtained above were dried at 80° C. for 24 hours to prepare respective test specimens for a tensile test in accordance with the test specimen Type 2 in JIS K 7127 with an injection molding machine [ROBOTSHOT α-30C manufactured by FANUC CORPORATION].

(Method of Evaluating Tensile Strength)

The tensile strength (MPa) of the test specimens for a tensile test prepared above was measured in accordance with JIS K 7161 with a tensile tester [Instron tester 5567 manufactured by Instron] under conditions of a distance between marked lines of 25 mm and a testing speed: 50 mm/min.

<Measurement of Physical Properties of Materials Used>

The MFR of the base resin and the maleic anhydride-modified polyethylenes A to G, which are thermoplastic resins, the relative intensity ratio in the infrared absorption spectrum of the maleic anhydride-modified polyethylenes A to G, and the one-minute half-life temperature of the organic peroxides to be used were measured in the following manners.

(Method of Measuring MFR)

The mass (g/10 min) of a polymer that flows out per 10 minutes at 190° C. under a load of 2.16 kg was determined using MELT INDEXER [manufactured by Toyo Seiki Seisaku-sho, Ltd.] in accordance with JIS K 7210.

(Method of Measuring Relative Intensity Ratio in Infrared Absorption Spectrum)

Each maleic anhydride-modified polyethylene was hot-pressed at 150° C. and 200 kgf/cm² for 5 minutes to prepare a film having a thickness of 100 μm. The infrared absorption spectrum of this film was measured to determine the relative intensity ratio from the ratio of absorption intensity at around 1791 cm⁻/absorption intensity at around 719 cm⁻¹.

(Method of Measuring One-Minute Half-Life Temperature of Organic Peroxide)

The half-life, which is a time until the amount of active oxygen in an organic peroxide becomes half the amount before decomposition when the organic peroxide decomposes due to heat, was determined by preparing a benzene solution of the organic peroxide the concentration of which is 0.1 mol/L and measuring a change in the organic peroxide concentration with time when the organic peroxide was thermally decomposed.

<Test Specimen as Lamp Body>

Example 1

A thermoplastic resin composition formed using 11 parts by mass of the cellulose, 1 part by mass of the maleic anhydride-modified polyethylene A, and 0.10 parts by mass of the dialkyl peroxide A each based on 100 parts by mass of the high density polyethylene was heated and kneaded with a twin-screw extruder [KZW15TW-45MG-NH manufactured by TECHNOVEL CORPORATION] to obtain a pellet of a cellulose-reinforced thermoplastic resin. Thereafter, a test specimen for evaluating tensile strength was prepared using the pellet with an injection molding machine [ROBOTSHOT α-30C manufactured by FANUC CORPORATION].

Examples 2 to 5

Pellets of cellulose-reinforced thermoplastic resin compositions were each prepared in the same manner as in Example 1, except that the compounded amount of the maleic anhydride-modified polyethylene A in the thermoplastic resin composition of Example 1 was changed as shown in Table 1 described below. Thereafter, test specimens as lamp bodies each provided with a resin part for evaluating tensile tension were each prepared using these pellets.

Example 6

A pellet of a cellulose-reinforced thermoplastic resin composition was produced in the same manner as in Example 1, except that the composition in the thermoplastic resin composition of Example 1 was changed to 11 parts by mass of the cellulose, 2 parts by mass of the maleic anhydride-modified polyethylene A, and 0.05 parts by mass of the dialkyl peroxide A each based on 100 parts by mass of the high density polyethylene. Thereafter, a test specimen as a lamp body provided with a resin part for evaluating tensile strength was prepared using this pellet.

Example 7

A pellet of a cellulose-reinforced thermoplastic resin composition was produced in the same manner as in Example 1, except that the composition in the thermoplastic resin composition of Example 1 was changed to 11 parts by mass of the cellulose, 5 parts by mass of the maleic anhydride-modified polyethylene A, and 0.05 parts by mass of the dialkyl peroxide A each based on 100 parts by mass of the high density polyethylene. Thereafter, a test specimen as a lamp body provided with a resin part for evaluating tensile strength was prepared using this pellet.

Example 8

A pellet of a cellulose-reinforced thermoplastic resin composition was produced in the same manner as in Example 1, except that the composition in the thermoplastic resin composition of Example 1 was changed to 11 parts by mass of the cellulose, 10 parts by mass of the maleic anhydride-modified polyethylene A, and 0.05 parts by mass of the dialkyl peroxide A each based on 100 parts by mass of the high density polyethylene. Thereafter, a test specimen as a lamp body provided with a resin part for evaluating tensile strength was prepared using this pellet.

Example 9

A pellet of a cellulose-reinforced thermoplastic resin composition was produced in the same manner as in Example 1, except that the composition in the thermoplastic resin composition of Example 1 was changed to 11 parts by mass of the cellulose, 5 parts by mass of the maleic anhydride-modified polyethylene A, and 0.01 parts by mass of the dialkyl peroxide A each based on 100 parts by mass of the high density polyethylene. Thereafter, a test specimen as a lamp body provided with a resin part for evaluating tensile strength was prepared using this pellet.

Example 10

A pellet of a cellulose-reinforced thermoplastic resin composition was produced in the same manner as in Example 1, except that the composition in the thermoplastic resin composition of Example 1 was changed to 11 parts by mass of the cellulose, 5 parts by mass of the maleic anhydride-modified polyethylene A, and 0.03 parts by mass of the dialkyl peroxide A each based on 100 parts by mass of the high density polyethylene. Thereafter, a test specimen as a lamp body provided with a resin part for evaluating tensile strength was prepared using this pellet.

Example 11

A pellet of a cellulose-reinforced thermoplastic resin composition was produced in the same manner as in Example 1, except that the composition in the thermoplastic resin composition of Example 1 was changed to 11 parts by mass of the cellulose, 5 parts by mass of the maleic anhydride-modified polyethylene A, and 0.12 parts by mass of the dialkyl peroxide A each based on 100 parts by mass of the high density polyethylene. Thereafter, a test specimen as a lamp body provided with a resin part for evaluating tensile strength was prepared using this pellet.

Example 12

A pellet of a cellulose-reinforced thermoplastic resin composition was produced in the same manner as in Example 1, except that the composition in the thermoplastic resin composition of Example 1 was changed to 43 parts by mass of the cellulose, 5 parts by mass of the maleic anhydride-modified polyethylene A, and 0.10 parts by mass of the dialkyl peroxide A each based on 100 parts by mass of the high density polyethylene. Thereafter, a test specimen as a lamp body provided with a resin part for evaluating tensile strength was prepared using this pellet.

Example 13

A pellet of a cellulose-reinforced thermoplastic resin composition was produced in the same manner as in Example 1, except that the composition in the thermoplastic resin composition of Example 1 was changed to 73 parts by mass of the cellulose, 5 parts by mass of the maleic anhydride-modified polyethylene A, and 0.10 parts by mass of the dialkyl peroxide A each based on 100 parts by mass of the high density polyethylene. Thereafter, a test specimen as a lamp body provided with a resin part for evaluating tensile strength was prepared using this pellet.

Example 14

A pellet of a cellulose-reinforced thermoplastic resin composition was produced in the same manner as in Example 1, except that the maleic anhydride-modified polyethylene A was not used in the thermoplastic resin composition of Example 1. Thereafter, a test specimen as a lamp body provided with a resin part for evaluating tensile strength was prepared using this pellet.

Examples 15 to 20

A pellet of a cellulose-reinforced thermoplastic resin composition was produced in the same manner as in Example 1, except that the type of maleic anhydride-modified polyethylene in the thermoplastic resin composition of Example 1 was changed to the type shown in Table 3 described below. Thereafter, a test specimen as a lamp body provided with a resin part for evaluating tensile strength was prepared using this pellet.

Example 21

A pellet of a cellulose-reinforced thermoplastic resin composition was produced in the same manner as in Example 1, except that the composition in the thermoplastic resin composition of Example 1 was changed to 11 parts by mass of the cellulose, 5 parts by mass of the maleic anhydride-modified polyethylene A, and 0.10 parts by mass of the peroxyketal each based on 100 parts by mass of the high density polyethylene. Thereafter, a test specimen as a lamp body provided with a resin part for evaluating tensile strength was prepared using this pellet.

Example 22

A pellet of a cellulose-reinforced thermoplastic resin composition was produced in the same manner as in Example 1, except that the composition in the thermoplastic resin composition of Example 1 was changed to 11 parts by mass of the cellulose, 5 parts by mass of the maleic anhydride-modified polyethylene A, and 0.17 parts by mass of the dialkyl peroxide B each based on 100 parts by mass of the high density polyethylene. Thereafter, a test specimen as a lamp body provided with a resin part for evaluating tensile strength was prepared using this pellet.

Example 23

A pellet of a cellulose-reinforced thermoplastic resin composition was produced in the same manner as in Example 1, except that the composition in the thermoplastic resin composition of Example 1 was changed to 11 parts by mass of the cellulose, 5 parts by mass of the maleic anhydride-modified polyethylene A, and 0.30 parts by mass of the diacyl peroxide each based on 100 parts by mass of the high density polyethylene. Thereafter, a test specimen as a lamp body provided with a resin part for evaluating tensile strength was prepared using this pellet.

Example 24

A pellet of a cellulose-reinforced thermoplastic resin composition was produced in the same manner as in Example 1, except that the composition in the thermoplastic resin composition of Example 1 was changed to 11 parts by mass of the cellulose, 5 parts by mass of the maleic anhydride-modified polyethylene A, and 0.09 parts by mass of the dialkyl peroxide C each based on 100 parts by mass of the high density polyethylene. Thereafter, a test specimen as a lamp body provided with a resin part for evaluating tensile strength was prepared using this pellet.

Example 25

A pellet of a cellulose-reinforced thermoplastic resin composition was produced in the same manner as in Example 1, except that the composition in the thermoplastic resin composition of Example 1 was changed to 11 parts by mass of the cellulose, 5 parts by mass of the maleic anhydride-modified polyethylene A, and 0.16 parts by mass of the alkyl peroxyester each based on 100 parts by mass of the high density polyethylene. Thereafter, a test specimen as a lamp body provided with a resin part for evaluating tensile strength was prepared using this pellet.

Example 26

A pellet of a cellulose-reinforced thermoplastic resin composition was produced in the same manner as in Example 1, except that the composition in the thermoplastic resin composition of Example 1 was changed to 11 parts by mass of the cellulose, 5 parts by mass of the maleic anhydride-modified polyethylene A, and 0.14 parts by mass of the monoperoxycarbonate each based on 100 parts by mass of the high density polyethylene. Thereafter, a test specimen as a lamp body provided with a resin part for evaluating tensile strength was prepared using this pellet.

Comparative Example 1

A pellet of a cellulose-reinforced thermoplastic resin composition was produced in the same manner as in Example 1, except that the maleic anhydride-modified polyethylene A and the organic peroxide were not used. Thereafter, a test specimen as a lamp body provided with a resin part for evaluating tensile strength was prepared using this pellet.

Comparative Example 2

A pellet of a cellulose-reinforced thermoplastic resin composition was produced in the same manner as in Example 1, except that the organic peroxide was not used. Thereafter, a test specimen as a lamp body provided with a resin part for evaluating tensile strength was prepared using this pellet.

<Test Specimen as Speaker Unit>

Example 27

A test specimen as a speaker unit provided with a resin part for evaluating tensile strength was prepared with an injection molding machine [ROBOTSHOT α-30C manufactured by FANUC CORPORATION] using the pellet of the cellulose-reinforced thermoplastic resin composition produced in Example 1.

Examples 28 to 52

Test specimens as speaker units each provided with a resin part for evaluating tensile strength were each prepared using each of the cellulose-reinforced thermoplastic resin compositions produced in Examples 2 to 26 in the same manner as in Example 27.

Comparative Example 3

A test specimen as a speaker unit provided with a resin part for evaluating tensile strength was prepared using the cellulose-reinforced thermoplastic resin composition produced in Comparative Example 1 in the same manner as in Example 27.

Comparative Example 4

A test specimen as a speaker unit provided with a resin part for evaluating tensile strength was prepared using the cellulose-reinforced thermoplastic resin composition produced in Comparative Example 2 in the same manner as in Example 27.

<Test Specimen as Connection Box and Connector>

Example 53

A test specimen as a connection box and a connector each provided with a resin part for evaluating tensile strength was prepared with an injection molding machine [ROBOTSHOT α-30C manufactured by FANUC CORPORATION] using the pellet of the cellulose-reinforced thermoplastic resin composition produced in Example 1.

Examples 54 to 78

Test specimens as connection boxes and connectors each provided with a resin part for evaluating tensile strength were each prepared using each of the cellulose-reinforced thermoplastic resin compositions produced in Examples 2 to 26 in the same manner as in Example 53.

Comparative Example 5

A test specimen as a connection box and a connector each provided with a resin part for evaluating tensile strength was prepared using the cellulose-reinforced thermoplastic resin composition produced in Comparative Example 1 in the same manner as in Example 53.

Comparative Example 6

A test specimen as a connection box and a connector each provided with a resin part for evaluating tensile strength was prepared using the cellulose-reinforced thermoplastic resin composition produced in Comparative Example 2 in the same manner as in Example 53.

<Test Specimen as Pulley>

Example 79

A test specimen as a pulley provided with a resin part for evaluating tensile strength was prepared with an injection molding machine [ROBOTSHOT α-30C manufactured by FANUC CORPORATION] using the pellet of the cellulose-reinforced thermoplastic resin composition produced in Example 1.

Examples 80 to 104

Test specimens as pulleys each provided with a resin part for evaluating tensile strength were each prepared using each of the cellulose-reinforced thermoplastic resin compositions produced in Examples 2 to 26 in the same manner as in Example 79.

Comparative Example 7

A test specimen as a pulley provided with a resin part for evaluating tensile strength was prepared using the cellulose-reinforced thermoplastic resin composition produced in Comparative Example 1 in the same manner as in Example 79.

Comparative Example 8

A test specimen as a pulley provided with a resin part for evaluating tensile strength was prepared using the cellulose-reinforced thermoplastic resin composition produced in Comparative Example 2 in the same manner as in Example 79.

<Test Specimen as Film for House>

Example 105

A test specimen as a film for a house, the film provided with a resin part for evaluating tensile strength, was prepared with an injection molding machine [ROBOTSHOT α-30C manufactured by FANUC CORPORATION] using the pellet of the cellulose-reinforced thermoplastic resin composition produced in Example 1.

Examples 106 to 130

Test specimens as films for a house, the films each provided with a resin part for evaluating tensile strength, were each prepared using each of the cellulose-reinforced thermoplastic resin compositions produced in Examples 2 to 26 in the same manner as in Example 105.

Comparative Example 9

A test specimen as film for a house, the film provided with a resin part for evaluating tensile strength, was prepared using the cellulose-reinforced thermoplastic resin composition produced in Comparative Example 1 in the same manner as in Example 105.

Comparative Example 10

A test specimen as a film for a house, the film provided with a resin part for evaluating tensile strength, was prepared using the cellulose-reinforced thermoplastic resin composition produced in Comparative Example 2 in the same manner as in. Example 105.

Obtained results are shown together in Tables 1 to 25 below. It is to be noted that blanks in each material component in the tables indicate that the material component was not used, or was not evaluated because the material component was not used.

TABLE 1

| Item | Composition | Example 1 | Example 2 | Example 3 | Example 4 | Example 5 | Example 6 | Example 7 |
| --- | --- | --- | --- | --- | --- | --- | --- | --- |
| Thermoplastic resins | Base resin HDPE | 100 | 100 | 100 | 100 | 100 | 100 | 100 |
| | Coupling agent Maleic anhydride-modified polyethylene A | 1 | 2 | 3 | 5 | 10 | 2 | 5 |
| | MFR [g/10 min.] | 9.0 | 9.0 | 9.0 | 9.0 | 9.0 | 9.0 | 9.0 |
| | Relative intensity ratio in infrared spectrum | 0.15 | 0.15 | 0.15 | 0.15 | 0.15 | 0.15 | 0.15 |
| Cellulose | Pulp | 11 | 11 | 11 | 11 | 11 | 11 | 11 |
| Organic Peroxide | Dialkyl peroxide A | 0.10 | 0.10 | 0.10 | 0.10 | 0.10 | 0.05 | 0.05 |
| | One-minute half-life temperature [° C.] | 179.8 | 179.8 | 179.8 | 179.8 | 179.8 | 179.8 | 179.8 |
| Evaluation | Tensile strength [MPa] | 52 | 57 | 52 | 60 | 54 | 52 | 51 |

TABLE 2

| Item | | Composition | Example 8 | Example 9 | Example 10 | Example 11 | Example 12 | Example 13 | Example 14 |
|---|---|---|---|---|---|---|---|---|---|
| Thermoplastic resins | Base resin | HDPE | 100 | 100 | 100 | 100 | 100 | 100 | 100 |
| | Coupling agent | Maleic anhydride-modified polyethylene A | 10 | 5 | 5 | 5 | 5 | 5 | |
| | | MFR [g/10 min.] | 9.0 | 9.0 | 9.0 | 9.0 | 9.0 | 9.0 | |
| | | Relative intensity ratio in infrared spectrum | 0.15 | 0.15 | 0.15 | 0.15 | 0.15 | 0.15 | |
| Cellulose | | Pulp | 11 | 11 | 11 | 11 | 43 | 73 | 11 |
| Organic Peroxide | | Dialkyl peroxide A | 0.05 | 0.01 | 0.03 | 0.12 | 0.10 | 0.10 | 0.10 |
| | | One-minute half-life temperature [° C.] | 179.8 | 179.8 | 179.8 | 179.8 | 179.8 | 179.8 | 179.8 |
| Evaluation | | Tensile strength [MPa] | 44 | 40 | 47 | 52 | 54 | 52 | 50 |

TABLE 3

| Item | | Composition | Example 15 | Example 16 | Example 17 | Example 18 | Example 19 | Example 20 |
|---|---|---|---|---|---|---|---|---|
| Thermoplastic resins | Base resin | HDPE | 100 | 100 | 100 | 100 | 100 | 100 |
| | Coupling agent | Maleic anhydride-modified polyethylene B | 5 | | | | | |
| | | Maleic anhydride-modified polyethylene C | | 5 | | | | |
| | | Maleic anhydride-modified polyethylene D | | | 5 | | | |
| | | Maleic anhydride-modified polyethylene E | | | | 5 | | |
| | | Maleic anhydride-modified polyethylene F | | | | | 5 | |
| | | Maleic anhydride-modified polyethylene G | | | | | | 5 |
| | | MFR [g/10 min.] | 0.4 | 3.4 | 4.4 | 1.3 | 1.2 | 1.1 |
| | | Relative intensity ratio in infrared spectrum | 0.14 | 0.10 | 0.16 | 0.17 | 0.16 | 0.12 |
| Cellulose | | Pulp | 11 | 11 | 11 | 11 | 11 | 11 |
| Organic Peroxide | | Dialkyl peroxide A | 0.10 | 0.10 | 0.10 | 0.10 | 0.10 | 0.10 |
| | | One-minute half-life temperature [° C.] | 179.8 | 179.8 | 179.8 | 179.8 | 179.8 | 179.8 |
| Evaluation | | Tensile strength [MPa] | 57 | 56 | 56 | 59 | 59 | 58 |

TABLE 4

| item | | Composition | Example 21 | Example 22 | Example 23 | Example 24 | Example 25 | Example 26 |
|---|---|---|---|---|---|---|---|---|
| Thermoplastic resins | Base resin | HDPE | 100 | 100 | 100 | 100 | 100 | 100 |
| | Coupling agent | Maleic anhydride-modified polyethylene A | 5 | 5 | 5 | 5 | 5 | 5 |
| | | MFR [g/10 min.] | 9.0 | 9.0 | 9.0 | 9.0 | 9.0 | 9.0 |
| | | Relative intensity ratio in infrared spectrum | 0.15 | 0.15 | 0.15 | 0.15 | 0.15 | 0.15 |
| Cellulose | | Pulp | 11 | 11 | 11 | 11 | 11 | 11 |
| Organic Peroxide | | Peroxyketal | 0.10 | | | | | |
| | | Dialkyl peroxide B | | 0.17 | | | | |
| | | Diacyl peroxide | | | 0.30 | | | |
| | | Dialkyl peroxide C | | | | 0.09 | | |
| | | Alkyl peroxyester | | | | | 0.16 | |
| | | Monoperoxycarbonate | | | | | | 0.14 |
| | | One-minute half-life temperature [° C.] | 153.8 | 175.2 | 130.0 | 185.9 | 159.9 | 155.0 |
| Evaluation | | Tensile strength [MPa] | 55 | 57 | 51 | 57 | 56 | 53 |

TABLE 5

| Item | | Composition | Comparative Example 1 | Comparative Example 2 |
|---|---|---|---|---|
| Thermoplastic resins | Base resin | HDPE | 100 | 100 |
| | Coupling agent | Maleic anhydride-modified polyethylene A | | 5 |
| | | MFR [g/10 min.] | | 9.0 |
| | | Relative intensity ratio in infrared spectrum | | 0.15 |
| Cellulose | | Pulp | 11 | 11 |
| Organic Peroxide | | Dialkyl peroxide A | | |
| | | Peroxyketal | | |
| | | Dialkyl peroxide B | | |
| | | Diacyl peroxide | | |
| | | Dialkyl peroxide C | | |
| | | Alkyl peroxyester | | |
| | | Monoperoxycarbonate | | |
| Evaluation | | Tensile strength [MPa] | 33 | 35 |

TABLE 6

| Item | | Composition | Example 27 | Example 28 | Example 29 | Example 30 | Example 31 | Example 32 | Example 33 |
|---|---|---|---|---|---|---|---|---|---|
| Thermoplastic resins | Base resin | HDPE | 100 | 100 | 100 | 100 | 100 | 100 | 100 |
| | Coupling agent | Maleic anhydride-modified polyethylene A | 1 | 2 | 3 | 5 | 10 | 2 | 5 |
| | | MFR [g/10 min.] | 9.0 | 9.0 | 9.0 | 9.0 | 9.0 | 9.0 | 9.0 |
| | | Relative intensity ratio in infrared spectrum | 0.15 | 0.15 | 0.15 | 0.15 | 0.15 | 0.15 | 0.15 |
| Cellulose | | Pulp | 11 | 11 | 11 | 11 | 11 | 11 | 11 |
| Organic Peroxide | | Dialkyl peroxide A | 0.10 | 0.10 | 0.10 | 0.10 | 0.10 | 0.05 | 0.05 |
| | | One-minute half-life temperature [° C.] | 179.8 | 179.8 | 179.8 | 179.8 | 179.8 | 179.8 | 179.8 |
| Evaluation | | Tensile strength [MPa] | 52 | 57 | 52 | 60 | 54 | 52 | 51 |

TABLE 7

| Item | | Composition | Example 34 | Example 35 | Example 36 | Example 37 | Example 38 | Example 39 | Example 40 |
|---|---|---|---|---|---|---|---|---|---|
| Thermoplastic resins | Base resin | HDPE | 100 | 100 | 100 | 100 | 100 | 100 | 100 |
| | Coupling agent | Maleic anhydride-modified polyethylene A | 10 | 5 | 5 | 5 | 5 | 5 | |
| | | MFR [g/10 min.] | 9.0 | 9.0 | 9.0 | 9.0 | 9.0 | 9.0 | |
| | | Relative intensity ratio in infrared spectrum | 0.15 | 0.15 | 0.15 | 0.15 | 0.15 | 0.15 | |
| Cellulose | | Pulp | 11 | 11 | 11 | 11 | 43 | 73 | 11 |
| Organic Peroxide | | Dialkyl peroxide A | 0.05 | 0.01 | 0.03 | 0.12 | 0.10 | 0.10 | 0.10 |
| | | One-minute half-life temperature [° C.] | 179.8 | 179.8 | 179.8 | 179.8 | 179.8 | 179.8 | 179.8 |
| Evaluation | | Tensile strength [MPa] | 44 | 40 | 47 | 52 | 54 | 52 | 50 |

TABLE 8

| Item | | Composition | Example 41 | Example 42 | Example 43 | Example 44 | Example 45 | Example 46 |
|---|---|---|---|---|---|---|---|---|
| Thermoplastic resins | Base resin | HDPE | 100 | 100 | 100 | 100 | 100 | 100 |
| | Coupling agent | Maleic anhydride-modified polyethylene B | 5 | | | | | |
| | | Maleic anhydride-modified polyethylene C | | 5 | | | | |
| | | Maleic anhydride-modified polyethylene D | | | 5 | | | |
| | | Maleic anhydride-modified polyethylene E | | | | 5 | | |
| | | Maleic anhydride-modified polyethylene F | | | | | 5 | |
| | | Maleic anhydride-modified polyethylene G | | | | | | 5 |
| | | MFR [g/10 min.] | 0.4 | 3.4 | 4.4 | 1.3 | 1.2 | 1.1 |
| | | Relative intensity ratio in infrared spectrum | 0.14 | 0.10 | 0.16 | 0.17 | 0.16 | 0.12 |
| Cellulose | | Pulp | 11 | 11 | 11 | 11 | 11 | 11 |
| Organic Peroxide | | Dialkyl peroxide A | 0.10 | 0.10 | 0.10 | 0.10 | 0.10 | 0.10 |
| | | One-minute half-life temperature [° C.] | 179.8 | 179.8 | 179.8 | 179.8 | 179.8 | 179.8 |
| Evaluation | | Tensile strength [MPa] | 57 | 56 | 56 | 59 | 58 | 58 |

TABLE 9

| Item | | Composition | Example 47 | Example 48 | Example 49 | Example 50 | Example 51 | Example 52 |
|---|---|---|---|---|---|---|---|---|
| Thermoplastic resins | Base resin | HDPE | 100 | 100 | 100 | 100 | 100 | 100 |
| | Coupling agent | Maleic anhydride-modified polyethylene A | 5 | 5 | 5 | 5 | 5 | 5 |
| | | MFR [g/10 min.] | 9.0 | 9.0 | 9.0 | 9.0 | 9.0 | 9.0 |
| | | Relative intensity ratio in infrared spectrum | 0.15 | 0.15 | 0.15 | 0.15 | 0.15 | 0.15 |
| Cellulose | | Pulp | 11 | 11 | 11 | 11 | 11 | 11 |
| Organic Peroxide | | Peroxyketal | 0.10 | | | | | |
| | | Dialkyl peroxide B | | 0.17 | | | | |
| | | Diacyl peroxide | | | 0.30 | | | |
| | | Dialkyl peroxide C | | | | 0.09 | | |
| | | Alkyl peroxyester | | | | | 0.16 | |

TABLE 9-continued

| Item | Composition | Example 47 | Example 48 | Example 49 | Example 50 | Example 51 | Example 52 |
|---|---|---|---|---|---|---|---|
| | Monoperoxycarbonate | | | | | | 0.14 |
| | One-minute half-life temperature [° C.] | 153.8 | 175.2 | 130.0 | 185.9 | 159.9 | 155.0 |
| Evaluation | Tensile strength [MPa] | 55 | 57 | 51 | 57 | 56 | 53 |

TABLE 10

| Item | | Composition | Comparative Example 3 | Comparative Example 4 |
|---|---|---|---|---|
| Thermoplastic resins | Base resin | HDPE | 100 | 100 |
| | Coupling agent | Maleic anhydride-modified polyethylene A | | 5 |
| | | MFR [g/10 min.] | | 9.0 |
| | | Relative intensity ratio in infrared spectrum | | 0.15 |
| Cellulose | | Pulp | 11 | 11 |
| Organic | | Dialkyl peroxide A | | |
| Peroxide | | Peroxyketal | | |
| | | Dialkyl peroxide B | | |
| | | Diacyl peroxide | | |
| | | Dialkyl peroxide C | | |
| | | Alkyl peroxyester | | |
| | | Monoperoxycarbonate | | |
| Evaluation | | Tensile strength [MPa] | 33 | 35 |

TABLE 11

| Item | | Composition | Example 53 | Example 54 | Example 55 | Example 56 | Example 57 | Example 58 | Example 59 |
|---|---|---|---|---|---|---|---|---|---|
| Thermoplastic resins | Base resin | HDPE | 100 | 100 | 100 | 100 | 100 | 100 | 100 |
| | Coupling agent | Maleic anhydride-modified polyethylene A | 1 | 2 | 3 | 5 | 10 | 2 | 5 |
| | | MFR [g/10 min.] | 9.0 | 9.0 | 9.0 | 9.0 | 9.0 | 9.0 | 9.0 |
| | | Relative intensity ratio in infrared spectrum | 0.15 | 0.15 | 0.15 | 0.15 | 0.15 | 0.15 | 0.15 |
| Cellulose | | Pulp | 11 | 11 | 11 | 11 | 11 | 11 | 11 |
| Organic Peroxide | | Dialkyl peroxide A | 0.10 | 0.10 | 0.10 | 0.10 | 0.10 | 0.05 | 0.05 |
| | | One-minute half-life temperature [° C.] | 179.8 | 179.8 | 179.8 | 179.8 | 170.8 | 179.8 | 179.8 |
| Evaluation | | Tensile strength [MPa] | 52 | 57 | 52 | 60 | 54 | 52 | 51 |

TABLE 12

| Item | | Composition | Example 60 | Example 61 | Example 62 | Example 63 | Example 64 | Example 65 | Example 66 |
|---|---|---|---|---|---|---|---|---|---|
| Thermoplastic resins | Base resin | HDPE | 100 | 100 | 100 | 100 | 100 | 100 | 100 |
| | Coupling agent | Maleic anhydride-modified polyethylene A | 10 | 5 | 5 | 5 | 5 | 5 | |
| | | MFR [g/10 min.] | 9.0 | 9.0 | 9.0 | 9.0 | 9.0 | 9.0 | |
| | | Relative intensity ratio in infrared spectrum | 0.15 | 0.15 | 0.15 | 0.15 | 0.15 | 015 | |
| Cellulose | | Pulp | 11 | 11 | 11 | 11 | 43 | 73 | 11 |
| Organic Peroxide | | Dialkyl peroxide A | 0.05 | 0.01 | 0.03 | 0.12 | 0.10 | 0.10 | 0.10 |
| | | One-minute half-life temperature [° C.] | 179.8 | 179.8 | 179.8 | 179.8 | 179.8 | 179.8 | 179.8 |
| Evaluation | | Tensile strength [MPa] | 44 | 40 | 47 | 52 | 54 | 52 | 50 |

TABLE 13

| Item | | Composition | Example 67 | Example 68 | Example 69 | Example 70 | Example 71 | Example 72 |
|---|---|---|---|---|---|---|---|---|
| Thermoplastic resins | Base resin | HDPE | | 100 | 100 | 100 | 100 | 100 |
| | Coupling agent | Maleic anhydride-modified polyethylene B | 5 | | | | | |
| | | Maleic anhydride-modified polyethylene C | | 5 | | | | |
| | | Maleic anhydride-modified polyethylene D | | | 5 | | | |
| | | Maleic anhydride-modified polyethylene E | | | | 5 | | |

TABLE 13-continued

| Item | Composition | Example 67 | Example 68 | Example 69 | Example 70 | Example 71 | Example 72 |
|---|---|---|---|---|---|---|---|
| | Maleic anhydride-modified polyethylene F | | | | | 5 | |
| | Maleic anhydride-modified polyethylene G | | | | | | 5 |
| | MFR [g/10 min.] | 0.4 | 3.4 | 4.4 | 1.3 | 1.2 | 1.1 |
| | Relative intensity ratio in infrared spectrum | 0.14 | 0.10 | 0.16 | 0.17 | 0.16 | 0.12 |
| Cellulose | Pulp | 11 | 11 | 11 | 11 | 11 | 11 |
| Organic Peroxide | Dialkyl peroxide A | 0.10 | 0.10 | 0.10 | 0.10 | 0.10 | 0.10 |
| | One-minute half-life temperature [° C.] | 179.8 | 179.8 | 179.8 | 179.8 | 179.8 | 179.8 |
| Evaluation | Tensile strength [MPa] | 57 | 56 | 56 | 59 | 59 | 58 |

TABLE 14

| Item | | Composition | Example 73 | Example 74 | Example 75 | Example 76 | Example 77 | Example 78 |
|---|---|---|---|---|---|---|---|---|
| Thermoplastic resins | Base resin | HDPE | 100 | 100 | 100 | 100 | 100 | 100 |
| | Coupling agent | Maleic anhydride-modified polyethylene A | 5 | 5 | 5 | 5 | 5 | 5 |
| | | MFR [g/10 min.] | 9.0 | 9.0 | 9.0 | 9.0 | 9.0 | 9.0 |
| | | Relative intensity ratio in infrared spectrum | 0.15 | 0.15 | 0.15 | 0.15 | 0.15 | 0.15 |
| Cellulose | | Pulp | 11 | 11 | 11 | 11 | 11 | 11 |
| Organic Peroxide | | Peroxyketal | 0.10 | | | | | |
| | | Dialkyl peroxide B | | 0.17 | | | | |
| | | Diacyl peroxide | | | 0.30 | | | |
| | | Dialkyl peroxide C | | | | 0.09 | | |
| | | Alkyl peroxyester | | | | | 0.16 | |
| | | Monoperoxycarbonate | | | | | | 0.14 |
| | | One-minute half-life temperature [° C.] | 153.8 | 175.2 | 130.0 | 185.9 | 159.9 | 155.0 |
| Evaluation | | Tensile strength [MPa] | 55 | 57 | 51 | 57 | 56 | 53 |

TABLE 15

| Item | | Composition | Comparative Example 5 | Comparative Example 6 |
|---|---|---|---|---|
| Thermoplastic resins | Base resin | HDPE | 100 | 100 |
| | Coupling agent | Maleic anhydride-modified polyethylene A | | 5 |
| | | MFR [g/10 min.] | | 9.0 |
| | | Relative intensity ratio in infrared spectrum | | 0.15 |
| Cellulose | | Pulp | 11 | 11 |
| Organic Peroxide | | Dialkyl peroxide A | | |
| | | Peroxyketal | | |
| | | Dialkyl peroxide B | | |
| | | Diacyl peroxide | | |
| | | Dialkyl peroxide C | | |
| | | Alkyl peroxyester | | |
| | | Monoperoxycarbonate | | |
| Evaluation | | Tensile strength [MPa] | 33 | 35 |

TABLE 16

| Item | | Composition | Example 79 | Example 80 | Example 81 | Example 82 | Example 83 | Example 84 | Example 85 |
|---|---|---|---|---|---|---|---|---|---|
| Thermoplastic resins | Base resin | HDPE | 100 | 100 | 100 | 100 | 100 | 100 | 100 |
| | Coupling agent | Maleic anhydride-modified polyethylene A | 1 | 2 | 3 | 5 | 10 | 2 | 5 |
| | | MFR [g/10 min.] | 9.0 | 9.0 | 9.0 | 9.0 | 9.0 | 9.0 | 9.0 |
| | | Relative intensity ratio in infrared spectrum | 0.15 | 0.15 | 0.15 | 0.15 | 0.15 | 0.15 | 0.15 |
| Cellulose | | Pulp | 11 | 11 | 11 | 11 | 11 | 11 | 11 |
| Organic peroxide | | Dialkyl peroxide A | 0.10 | 0.10 | 0.10 | 0.10 | 0.10 | 0.05 | 0.05 |
| | | One-minute half-life temperature [° C.] | 179.8 | 179.8 | 179.8 | 179.8 | 179.8 | 179.8 | 179.8 |
| Evaluation | | Tensile strength [MPa] | 52 | 57 | 52 | 50 | 54 | 52 | 51 |

TABLE 17

| Item | | Composition | Example 86 | Example 87 | Example 88 | Example 89 | Example 90 | Example 91 | Example 92 |
|---|---|---|---|---|---|---|---|---|---|
| Thermoplastic resins | Base resin | HDPE | 100 | 100 | 100 | 100 | 100 | 100 | 100 |
| | Coupling agent | Maleic anhydride-modified polyethylene A | 10 | 5 | 5 | 5 | 5 | 5 | |

TABLE 17-continued

| Item | Composition | Example 86 | Example 87 | Example 88 | Example 89 | Example 90 | Example 91 | Example 92 |
|---|---|---|---|---|---|---|---|---|
| | MFR [g/10 min.] | 9.0 | 9.0 | 9.0 | 9.0 | 9.0 | 9.0 | |
| | Relative intensity ratio in infrared spectrum | 0.15 | 0.15 | 0.15 | 0.15 | 0.15 | 0.15 | |
| Cellulose | Pulp | 11 | 11 | 11 | 11 | 43 | 73 | 11 |
| Organic Peroxide | Dialkyl peroxide A | 0.05 | 0.01 | 0.03 | 0.12 | 0.10 | 0.10 | 0.10 |
| | One-minute half-life temperature [° C.] | 179.8 | 179.8 | 179.8 | 179.8 | 179.8 | 179.8 | 179.8 |
| Evaluation | Tensile strength [MPa] | 44 | 40 | 47 | 52 | 54 | 52 | 50 |

TABLE 18

| Item | | Composition | Example 93 | Example 94 | Example 95 | Example 96 | Example 97 | Example 98 |
|---|---|---|---|---|---|---|---|---|
| Thermoplastic resins | Base resin | HDPE | 100 | 100 | 100 | 100 | 100 | 100 |
| | Coupling agent | Maleic anhydride-modified polyethylene B | 5 | | | | | |
| | | Maleic anhydride-modified polyethylene C | | 5 | | | | |
| | | Maleic anhydride-modified polyethylene D | | | 5 | | | |
| | | Maleic anhydride-modified polyethylene E | | | | 5 | | |
| | | Maleic anhydride-modified polyethylene F | | | | | 5 | |
| | | Maleic anhydride-modified polyethylene G | | | | | | 5 |
| | | MFR [g/10 min.] | 0.4 | 3.4 | 4.4 | 1.3 | 1.2 | 1.1 |
| | | Relative intensity ratio in infrared spectrum | 0.14 | 0.10 | 0.16 | 0.17 | 0.16 | 0.12 |
| Cellulose | | Pulp | 11 | 11 | 11 | 11 | 11 | 11 |
| Organic Peroxide | | Dialkyl peroxide A | 0.10 | 0.10 | 0.10 | 0.10 | 0.10 | 0.10 |
| | | One-minute half-life temperature [° C.] | 179.8 | 179.8 | 179.8 | 179.8 | 179.8 | 179.8 |
| Evaluation | | Tensile strength [MPa] | 57 | 56 | 56 | 59 | 58 | 58 |

TABLE 19

| Item | | Composition | Example 99 | Example 100 | Example 101 | Example 102 | Example 103 | Example 104 |
|---|---|---|---|---|---|---|---|---|
| Thermoplastic resins | Base resin | HDPE | 100 | 100 | 100 | 100 | 100 | 100 |
| | Coupling agent | Maleic anhydride-modified polyethylene A | 5 | 5 | 5 | 5 | 5 | 5 |
| | | MFR [g/10 min.] | 9.0 | 9.0 | 9.0 | 9.0 | 9.0 | 9.0 |
| | | Relative intensity ratio in infrared spectrum | 0.15 | 0.15 | 0.15 | 0.15 | 0.15 | 0.15 |
| Cellulose | | Pulp | 11 | 11 | 11 | 11 | 11 | 11 |
| Organic Peroxide | | Peroxyketal | 0.10 | | | | | |
| | | Dialkyl peroxide B | | 0.17 | | | | |
| | | Diacyl peroxide | | | 0.30 | | | |
| | | Dialkyl peroxide C | | | | 0.09 | | |
| | | Alkyl peroxyester | | | | | 0.16 | |
| | | Monoperoxycarbonate | | | | | | 0.14 |
| | | One-minute half-life temperature [° C.] | 153.8 | 175.2 | 130.0 | 185.9 | 159.9 | 155.0 |
| Evaluation | | Tensile strength [MPa] | 55 | 57 | 51 | 57 | 56 | 53 |

TABLE 20

| Item | | Composition | Comparative Example 7 | Comparative Example 8 |
|---|---|---|---|---|
| Thermoplastic resins | Base resin | HDPE | 100 | 100 |
| | Coupling agent | Maleic anhydride-modified polyethylene A | | 5 |
| | | MFR [g/10 min.] | | 9.0 |
| | | Relative intensity ratio in infrared spectrum | | 0.15 |
| Cellulose | | Pulp | 11 | 11 |
| Organic Peroxide | | Dialkyl peroxide A | | |
| | | Peroxyketal | | |
| | | Dialkyl peroxide B | | |
| | | Diacyl peroxide | | |
| | | Dialkyl peroxide C | | |
| | | Alkyl peroxyester | | |
| | | Monoperoxycarbonate | | |
| Evaluation | | Tensile strength [MPa] | 33 | 35 |

TABLE 21

| Item | | Composition | Example 105 | Example 106 | Example 107 | Example 108 | Example 109 | Example 110 | Example 111 |
|---|---|---|---|---|---|---|---|---|---|
| Thermoplastic resins | Base resin | HDPE | 100 | 100 | 100 | 100 | 100 | 100 | 100 |
| | Coupling agent | Maleic anhydride-modified polyethylene A | 1 | 2 | 3 | 5 | 10 | 2 | 5 |
| | | MFR [g/10 min.] | 9.0 | 9.0 | 9.0 | 9.0 | 9.0 | 9.0 | 9.0 |
| | | Relative intensity ratio in infrared spectrum | 0.15 | 0.15 | 0.15 | 0.15 | 0.15 | 0.15 | 0.15 |
| Cellulase | | Pulp | 11 | 11 | 11 | 11 | 11 | 11 | 11 |
| Organic Peroxide | | Dialkyl peroxide A | 0.10 | 0.10 | 0.10 | 0.10 | 0.10 | 0.05 | 0.05 |
| | | One-minute half-life temperature [° C.] | 179.8 | 179.8 | 179.8 | 179.8 | 179.8 | 179.8 | 179.8 |
| Evaluation | | Tensile strength [MPa] | 52 | 57 | 52 | 60 | 54 | 52 | 51 |

TABLE 22

| Item | | Composition | Example 112 | Example 113 | Example 114 | Example 115 | Example 116 | Example 117 | Example 118 |
|---|---|---|---|---|---|---|---|---|---|
| Thermoplastic resins | Base resin | HDPE | 100 | 100 | 100 | 100 | 100 | 100 | 100 |
| | Coupling agent | Maleic anhydride-modified polyethylene A | 10 | 5 | 5 | 5 | 5 | 5 | |
| | | MFR [g/10 min.] | 9.0 | 9.0 | 9.0 | 9.0 | 9.0 | 9.0 | |
| | | Relative intensity ratio in infrared spectrum | 0.15 | 0.15 | 0.15 | 0.15 | 0.15 | 0.15 | |
| Cellulose | | Pulp | 11 | 11 | 11 | 11 | 43 | 73 | 11 |
| Organic Peroxide | | Dialkyl peroxide A | 0.05 | 0.01 | 0.03 | 0.12 | 0.10 | 0.10 | 0.10 |
| | | One-minute half-life temperature [° C.] | 179.8 | 179.8 | 179.8 | 179.8 | 179.8 | 179.8 | 178.8 |
| Evaluation | | Tensile strength [MPa] | 44 | 40 | 47 | 52 | 54 | 52 | 50 |

TABLE 23

| Item | | Composition | Example 119 | Example 120 | Example 121 | Example 122 | Example 123 | Example 124 |
|---|---|---|---|---|---|---|---|---|
| Thermoplastic resins | Base resin | HDPE | 100 | 100 | 100 | 100 | 100 | 100 |
| | Coupling agent | Maleic anhydride-modified polyethylene B | 5 | | | | | |
| | | Maleic anhydride-modified polyethylene C | | 5 | | | | |
| | | Maleic anhydride-modified polyethylene D | | | 5 | | | |
| | | Maleic anhydride-modified polyethylene E | | | | 5 | | |
| | | Maleic anhydride-modified polyethylene F | | | | | 5 | |
| | | Maleic anhydride-modified polyethylene G | | | | | | 5 |
| | | MFR [g/10 min.] | 0.4 | 3.4 | 4.4 | 1.3 | 1.2 | 1.1 |
| | | Relative intensity ratio in infrared spectrum | 0.14 | 0.10 | 0.16 | 0.17 | 0.16 | 0.12 |
| Cellulose | | Pulp | 11 | 11 | 11 | 11 | 11 | 11 |
| Organic Peroxide | | Dialkyl peroxide A | 0.10 | 0.10 | 0.10 | 0.10 | 0.10 | 0.10 |
| | | One-minute half-life temperature [° C.] | 179.8 | 179.8 | 179.8 | 179.8 | 179.8 | 179.8 |
| Evaluation | | Tensile strength [MPa] | 57 | 56 | 56 | 59 | 59 | 58 |

TABLE 24

| Item | | Composition | Example 125 | Example 126 | Example 127 | Example 128 | Example 129 | Example 130 |
|---|---|---|---|---|---|---|---|---|
| Thermoplastic resins | Base resin | HDPE | 100 | 100 | 100 | 100 | 100 | 100 |
| | Coupling agent | Maleic anhydride-modified polyethylene A | 5 | 5 | 5 | 5 | 5 | 5 |
| | | MFR [g/10 min.] | 9.0 | 9.0 | 9.0 | 9.0 | 9.0 | 9.0 |
| | | Relative intensity ratio in infrared spectrum | 0.15 | 0.15 | 0.15 | 0.15 | 0.15 | 0.15 |
| Cellulose | | Pulp | 11 | 11 | 11 | 11 | 11 | 11 |
| Organic Peroxide | | Peroxyketal | 0.10 | | | | | |
| | | Dialkyl peroxide B | | 0.17 | | | | |
| | | Diacyl peroxide | | | 0.30 | | | |
| | | Dialkyl peroxide C | | | | 0.09 | | |
| | | Alkyl peroxyester | | | | | 0.16 | |

TABLE 24-continued

| Item | Composition | Example 125 | Example 126 | Example 127 | Example 128 | Example 129 | Example 130 |
|---|---|---|---|---|---|---|---|
| | Monoperoxycarbonate | | | | | | 0.14 |
| | One-minute half-life temperature [° C.] | 153.8 | 175.2 | 130.0 | 185.9 | 159.9 | 155.0 |
| Evaluation | Tensile strength [MPa] | 55 | 57 | 51 | 57 | 56 | 53 |

TABLE 25

| Item | | Composition | Comparative Example 9 | Comparative Example 10 |
|---|---|---|---|---|
| Thermoplastic resins | Base resin | HDPE | 100 | 100 |
| | Coupling agent | Maleic anhydride-modified polyethylene A | | 5 |
| | | MFR [g/10 min.] | | 9.0 |
| | | Relative intensity ratio in infrared spectrum | | 0.15 |
| Cellulose | | Pulp | 11 | 11 |
| Organic Peroxide | | Dialkyl peroxide A | | |
| | | Peroxyketal | | |
| | | Dialkyl peroxide B | | |
| | | Diacyl peroxide | | |
| | | Dialkyl peroxide C | | |
| | | Alkyl peroxyester | | |
| | | Monoperoxycarbonate | | |
| Evaluation | | Tensile strength [MPa] | 33 | 35 |

As it is clear from Tables 1 to 25 above, all of the test specimens of the lamp bodies, the speaker units, the connection boxes and the connectors, the pulleys, and the films for a house each provided with a resin part formed from the cellulose-reinforced thermoplastic resin compositions obtained by heating and kneading the thermoplastic resin compositions of Examples 1 to 130 of the present disclosure achieved a tensile strength of 40 MPa or more, the tensile strength measured in accordance with JIS K 7161, and, on the other hand, exhibited a higher tensile strength than the test specimens of the lamp bodies, the speaker units, the connection boxes and the connectors, the pulleys, and the films for a house each provided with a resin part of Comparative Examples 1 to 10. From this fact, it is found that the thermoplastic resin compositions of Examples 1 to 130 in which cellulose is uniformly dispersed and contained, and the cellulose-reinforced thermoplastic resin compositions obtained using the thermoplastic resin compositions have an action capable of improving the mechanical strength of a molded material. In addition, in Examples 1 to 130, the thermoplastic resin compositions and the cellulose-reinforced thermoplastic resin compositions each having such an action were used, and therefore a lamp body, a speaker unit, a connection box and a connector, a pulley, a film for a house each provided with a resin part having an improved mechanical strength were enabled to be prepared.

The cellulose-reinforced thermoplastic resin compositions obtained using the thermoplastic resin compositions of Examples 1 to 130 of the present disclosure improve the tensile strength and have a high reinforcing efficiency in the cellulose-reinforced thermoplastic resins, and therefore it is found that the cellulose-reinforced thermoplastic resin compositions are each useful as a lamp body, a speaker unit, a connection box and a connector, a pulley, or a film for a house provided with a resin part as a cellulose-reinforced resin. In addition, the cellulose-reinforced thermoplastic resin compositions are obtained from the thermoplastic resin compositions of Examples 1 to 130, and therefore it can be concluded that a lamp body, a speaker unit, a connection box and a connector, a pulley, or a film for a house provided with a resin part molded from the cellulose-reinforced thermoplastic resin compositions is reduced in weight and highly strengthened, and is excellent in recyclability and surface smoothness.

What is claimed is:

1. A molded article comprising a resin part formed with a. thermoplastic resin composition, the thermoplastic resin composition consisting of:
 a thermoplastic resin;
 a polyolefin resin;
 5 to 70 parts by mass of cellulose based on 100 parts by mass of the thermoplastic resin; and
 an organic peroxide, wherein
 a tensile strength of a resin molded body formed with the thermoplastic resin composition measured in accordance with JIS K 7161 is 40 MPa or more, wherein the thermoplastic resin is a mixed resin of a polyethylene resin modified by grafting an unsaturated carboxylic acid or an anhydride thereof, and a polyethylene resin not modified with an unsaturated carboxylic acid or an anhydride thereof, wherein
 the organic peroxide is at least one organic peroxide selected from t-butyl cumyl peroxide, di cumyl peroxide, α, α'-bis(t-butylperoxy-m-isopropyl)benzene, 2,5-dimethyl-2,5-di(t-butylperoxy) hexane, 2,5-dimethyl-2,5-di(t-butylperoxy)hexine-3, a peroxyketal, an alkyl peroxyester, and a monoperoxycarbonate, and wherein
 the molded article is a lamp body of a lighting appliance, a speaker unit, a connection box, a connector, or a pulley.

2. The molded article according to claim 1, wherein a content of the organic peroxide is 0.01 to 0.30 parts by mass based on 100 parts by mass of the thermoplastic resin.

3. The molded article according to claim 1, wherein the polyethylene resin modified by grafting an unsaturated carboxylic acid or an anhydride thereof is a maleic anhydride-modified polyethylene resin.

4. The molded article according to claim 1, wherein the cellulose is a plant-derived, fibrous cellulose.

5. A molded article comprising a resin part formed with a cellulose-reinforced thermoplastic resin composition, wherein
 the cellulose-reinforced thermoplastic resin composition is obtained by heating and kneading a thermoplastic resin composition to react contained components, wherein
 the thermoplastic resin composition consists of a thermoplastic resin; 5 to 70 parts by mass of cellulose based of 100 parts by mass of the thermoplastic resin; and an organic peroxide, wherein
 the cellulose-reinforced thermoplastic resin composition comprises an ester-bonded composite resin of a hydroxy group of cellulose and a polyolefin resin having a carboxy group and a crosslinked structure, wherein a content of a cellulose component in the ester-bonded composite resin is 9.0 to 42% by mass, a tensile strength of a resin molded body formed with the cellulose-reinforced thermoplastic resin composition measured in accordance with JIS K 7161 is 40 MPa or more, wherein the thermoplastic resin is a polyethylene resin, wherein the organic peroxide is at least one organic peroxide selected from t-butyl cumyl peroxide, dicumyl peroxide, α, α'-bis(t-butylperoxy-m-isopropyl)benzene, 2,5-dimethyl-2,5-di(t-butylperoxy) hexane, 2,5-dimethyl-2,5-di(t-butylperoxy)hexine-3, a peroxyketal, an alkyl peroxyester, and a monoperoxycarbonate, and wherein the molded article is a lamp body of a lighting appliance, a speaker unit, a connection box, a connector, or a pulley.

6. The molded article according to claim 5, wherein the polyolefin resin having a carboxy group and a crosslinked structure is a polyethylene resin having a crosslinked structure such that a carbon atom in a main chain of the polyethylene resin modified by grafting an unsaturated carboxylic acid or an anhydride thereof and a carbon atom in a main chain of a polyethylene resin not modified with an unsaturated carboxylic acid or an anhydride thereof are bonded at two or more sites.

7. The molded article according to claim 6, wherein a polyethylene resin before modification for obtaining the polyethylene resin modified by grafting an unsaturated carboxylic acid or an anhydride thereof and the polyethylene resin not modified with an unsaturated carboxylic acid or an anhydride thereof are different polyethylene resins.

8. The molded article according to claim 5, wherein the cellulose is a plant-derived, fibrous cellulose.

* * * * *